US006336085B1

United States Patent
Ueda et al.

(10) Patent No.: US 6,336,085 B1
(45) Date of Patent: Jan. 1, 2002

(54) SIMULATION METHOD OF EXTRACTION SYSTEM

(75) Inventors: Yoshinori Ueda; Miyuki Igarashi, both of Hitachinaka (JP)

(73) Assignee: Japan Nuclear Cycle Development Institute, Ibaraki-Ken (JP)

(*) Notice: Subject to any disclaimer, the term of this patent is extended or adjusted under 35 U.S.C. 154(b) by 0 days.

(21) Appl. No.: 09/184,696

(22) Filed: Nov. 3, 1998

(30) Foreign Application Priority Data

Nov. 10, 1997 (JP) ............................................. 9-307315

(51) Int. Cl.⁷ .............................. G06G 7/48; G06G 7/50
(52) U.S. Cl. ................................. 703/9; 703/10; 703/12
(58) Field of Search ............................... 703/9, 10, 12, 703/2

(56) References Cited

U.S. PATENT DOCUMENTS

| 5,255,212 A | * | 10/1993 | Kondoh et al. | .......... 395/500.3 |
| 5,408,638 A | * | 4/1995 | Sagawa et al. | ........ 395/500.21 |
| 5,537,641 A | * | 7/1996 | Lobo et al. | .................. 395/119 |
| 5,550,761 A | * | 8/1996 | Pauchon et al. | ............ 364/578 |
| 5,732,192 A | * | 3/1998 | Malin et al. | ........... 395/500.23 |
| 5,826,065 A | * | 10/1998 | Hinsberg, III et al. | ...... 395/500 |
| 5,910,902 A | * | 6/1999 | Molvig et al. | ......... 395/500.27 |
| 5,991,526 A | * | 11/1999 | Igarashi | ................. 395/500.23 |

FOREIGN PATENT DOCUMENTS

| EP | 0 160 944 B1 | 11/1985 |
| EP | 0 314 370 B1 | 5/1989 |
| EP | 0 228 915 B1 | 7/1989 |
| EP | 0 372 107 B1 | 6/1990 |
| EP | 0 476 167 B1 | 3/1992 |
| EP | 0 553 026 B1 | 7/1993 |
| GB | 2 124 102 A | 2/1984 |

OTHER PUBLICATIONS

"An Object Oriented Approach to Boundary Conditions in Finite Difference Fluid Dynamics Codes", Angus, IEEE 1992.*
"Sempa Software Engineering for Parallel Scientific Computing", Luksch et al., IEEE, Jul.–Sep. 1997.*
"Load Balancing and Object Orientation: A Cases Study from Mesoscale Flow Modeling", Buttner et al., IEEE 1995.*
"Object Oriented Modeling and Simulation of Process Plants with Discrete Logic Controls", Ghosh et al., IEEE 1995.*
"A Tool for On–Line Visualization and Interactive Steering of Parallel HPC Applications", Rathmayer et al., IEEE 1997.*
"Coal Extraction Using the Real–time Control Sysytem Reference Model", Horst et al., Mining Electrotechnology Conference, 1994.*
"Object Oriented Visualization", Silver, May 1995, IEEE.*
"The Design and Implementation of the Cortex Visualization System", Banerjee et al., IEEE 1994.*
"An Intelligent Dynamic Simulation Environment: An Object Oriented Approach", Robinson et al., IEEE 1989.*
"Recent Trends of Software Technology Industry," Chemical Equipment News, vol. 40, No. 486, 1995, pp. 186–189.
Gonda, "Calculation Code Revised Miset for Purex Process," PNCT 841–79–26, Feb. 1979, pp. 3–27.

(List continued on next page.)

Primary Examiner—Kevin J. Teska
Assistant Examiner—William Thomson
(74) Attorney, Agent, or Firm—Oliff & Berridge, PLC

(57) ABSTRACT

Abnormal flows in an extractor are simulated, with a flow divider model and a flow merger model being introduced. Overflow state, entrainment occurrence state, and reflux state in the extractor are simulated. Moreover, abnormal flows under a variety of conditions are simulated efficiently by using object-oriented software as the simulation program.

8 Claims, 22 Drawing Sheets-

SIMULATION OF ABNORMAL FLUID FLOW

OTHER PUBLICATIONS

G.L. Richardson et al., Plutonium Partitioning in the Purex Process with Hydrazine–Stabilized Hydroxylamine Nitrate, HEDL–TME–75–31, 1975.

Cherng–Shing, *Mathematical Modeling of Transient Two–Phase Flow Dynamics*, Nuclear Science Journal, vol. 29, No. 4, pp. 237–246, Aug. 1992.

Rinard, I. H., *Core Models, Coordinators, And Connectors In The Dynamic Modeling And Simulation Of Multiphase Systems*, Computers Chem. Engng., vol. 20, pp. 969–974, May, 1996.

Papadimitriou P. et al., *One–Dimensional Thermohydraulic Code Theseus and Its Application To Chilldown Process Simulation In Two–Phase Hydrogen Flows*, Cryogenics, vol. 32, No. 4, pp. 362–370, 1992.

Lamanna R. et al., *Analysis Of Composite Systems With Rasis: An Object –3 Oriented Interface*, Proceedings of the International Conference on Systems, Man and Cybernetics, vol. 4, pp. 263–267, Oct. 1993.

Leonardo M. R. et al., *Process Intelligent Modelling Through The API Concept For Real Time Applications*, Advances in Instrumentation and Control, vol. 49, No. Part 2, pp. 275–283, Jan. 1994.

Miyachi, Shigehiko et al., "Development of Computer Code in PNC 5. Development of the Simulation Codes MIXSET and PULCO for the Solvent Extraction on the Purex Process Reprocessing," PNC Technical Review, No. 76, Dec. 1990, pp. 45–51.*

* cited by examiner

ELEMENTS COMPOSING A MULTISTAGE EXTRACTION PROCESS CALCULATION

CONCEPTS OF THE PRESENT CODE

ELEMENT MODELS AND THEIR FUNCTIONS

SIMULATION OF ABNORMAL FLUID FLOW

CONCEPT OF COMPOSING A PROCESS MODEL

EXTRACTION APPARATUS MODEL

CROSS SECTION OF A CENTRIFUGAL EXTRACTOR

OVERFLOW TYPE

OVERFLOW TYPE : FOR CALCULATING STEADY STATE

ENTRAINMENT OCCURRENCE PHENOMENON

ENTRAINMENT TYPE

ENTRAINMENT TYPE : FOR CALCULATING STEADY STATE

REFLUX TYPE

REFLUX TYPE : FOR CALCULATING STEADY STATE

U CONCENTRATION IN ORGANIC PHASE (IN NORMAL FLOW STATE)

U CONCENTRATION IN WATER PHASE
(IN NORMAL FLOW STATE)

HNO3 CONCENTRATION IN ORGANIC PHASE
(IN NORMAL FLOW STATE)

HNO3 CONCENTRATION IN WATER PHASE
(IN NORMAL FLOW STATE)

CHANGE OF CONCENTRATION DUE TO OVERFLOW
(U CONCENTRATION IN WATER PHASE)

**CHANGE OF CONCENTRATION DUE TO OVERFLOW
(U CONCENTRATION IN ORGANIC PHASE)**

SIMULATION METHOD OF EXTRACTION SYSTEM

BACKGROUND OF THE INVENTION

1. Field of the Invention

The present invention relates to a simulation method of an extraction system that simulates the processing of an extraction system with extractor that mixes fluids of two phases and extracts substance included in one fluid into the other fluid.

2. Related Art

There is known, as a chemical engineering processes, solvent extraction processing which mixes fluids of two phases and extracts substance included in one fluid into the other fluid. Simulations using computers have also been utilized for analysis and evaluation of the solvent extraction processing.

In a nuclear fuel reprocessing plant, for example, an solvent extraction process is utilized for separating fission fuel such as uranium and plutonium from spent nuclear fuel. There have been proposals for simulation programs for solvent extraction process in a nuclear fuel reprocessing such as "'Development of the Simulation Codes MIXSET and PULCO for the Solvent Extraction on the PUREX Process Reprocessing', by Miyachi and Masui, PNC Technical Review, No.76, P45–51, December 1990". Simulation and analysis of the solvent extraction process in a nuclear fuel reprocessing are performed by executing such simulation programs.

Simulating various process conditions is expected to study advanced solvent extraction process for more economical, reliable, and safer reprocessing plant. Such a calculation model will be very complex and large-scale, but will require flexible and frequent modifications because of the many patterns of behavior to be studied. However, ordinary simulation programs are not easy to simulate complicated events and to change the models or mathematical equations frequently because they are designed to simulate predetermined events.

On the other hand, object-oriented software is proposed as analysis tools for design and operation of plants. For example, there is software named "Object DPS" being marketed by The Institute of Japanese Union of Scientists and Engineers. According to this software, programs which simulate each portion of the processes can be combined relatively easily. (See "Recent trends of software technology in chemical industry", No. 486, Vol. 40, 1995 extra edition of "Chemical Engineering"(in Japanese), November, 1995, published by Kagaku Kogyo Sha.) However object-oriented software of this kind can not be directly applied to each concrete process. In other words, programs corresponding to each of the processes must be developed in order to be applied to concrete processes.

SUMMARY OF THE INVENTION

An object of the present invention is to provide a simulation method of solvent extraction systems which facilitates a variety of simulations including calculations of the concentration profile under conditions in which abnormal flows occur in the process. To realize this feature, on the basis of utilizing object-oriented software, a solvent extraction processing is divided into several small-scale elemental models corresponding to appropriate units, and an overall model is made up by combining these individual elements for each behavior to be studied.

Then, by such simulations, a variety of plant design or operation method can be analyzed. Therefore, plants can be designed or operated utilizing the results of the analysis. The simulation, being particularly suitable for analyzing a solvent extraction process of nuclear fuel reprocessing, can be utilized for designing or operating plants.

The present invention is a simulation method of an extraction system which simulates the operation of an extraction system with extractors that mixes fluids of two phases and extract substance included in one fluid into the other fluid, wherein the simulation method utilizes object-oriented software for dividing the operation into basic elements for calculation, and provides as basic elements composing the extractor, a mixing section for simulating separation and mixing of fluids of two phases and mass transfer between the fluids of two phases, a dividing section for simulating a divided flow of a portion of the fluids, and a merging section for simulating merging of a plurality of fluids, in order to simulate the case of a flow other than the normal flow using the dividing section and the merging section.

According to the present invention, as described above, the extraction operation is divided into basic elements of appropriate units. Application to change of models or analysis equations is therefore easy. Additionally, a variety of abnormal flows in the process other than the normal flow can be easily simulated because a portion of the fluids can be divided in the dividing section and a plurality of fluids can be merged in the merging section.

The mixing section of the present invention also performs simulation of mass balance calculation and equilibrium concentration calculation separately. Separation of mass balance calculation and equilibrium concentration calculation facilitates setting of a variety of conditions.

The present invention also provides, as basic elements composing the extraction system, a settler section for simulating flows of separated fluids in the extractor and a piping section for simulating flows of fluids in sections following the settler section. Actual operation of the extractor can be faithfully reproduced because simulation is performed along flows of fluids inside the extractor.

Further, the present invention determines the divided-flow ratio in the dividing section to simulate flows other than the normal flow insides the extractor. A variety of abnormal flows (those other than the basic flow) can be simulated by disposing a dividing section at an arbitrary location where a flow other than the basic flow occurs, and allowing the flow into a merging section to be disposed at an arbitrary location.

Still further, the extractor of the present invention is a centrifugal extractor having an overflow piping at an inflow section, as well as letting fluids of two phases flow to the outside of a rotor and mixing the two, performing centrifugation inside the rotor, and individually discharging an external fluid and an internal fluid, having been separated by a weir, wherein simulation of three states of flows other than the normal flow is performed, namely, the overflow state in which fluids flow out through the overflow piping, the entrainment occurring state in which unseparated fluids of two phases overflow the weir, and the reflux state in which a fluid that has been separated and discharged from the rotor flows back again to the section mixing the fluids of two phases. Simulation of the overflow state, the entrainment occurring state, and the reflux state in the centrifugal extractor therefore becomes possible.

Moreover, the extractor is a mixer settler extractor comprising a mixing section and a separation section using gravity, wherein simulation of three states of flows other than the normal flow is performed, namely, the overflow state in which fluids flow out through the overflow piping, the entrainment occurring state in which unseparated fluids of two phases are discharged from the separation section using gravity, and the reflux state in which a fluid that has been separated flows back again to the section mixing the fluids of two phases. Simulation of the overflow state, the entrainment occurring state, and the reflux state therefore becomes possible in the mixer settler extractor.

The extraction system of the present invention is also an extraction system for performing multistage extraction with a plurality of extractors connected. Actual extraction systems, being usually multi-staged, can be simulated by the present invention.

The present invention is also a media for storing a simulation program of an extraction system for causing a computer to simulate the operation of an extraction system with extractors which mixes fluids of two phases and extract substance included in one fluid into the other fluid, wherein the simulation method utilizes object-oriented software for dividing the operation into basic elements for calculation, and provides, as basic elements composing the extractor, a mixing section for simulating separation and mixing of fluids of two phases and mass transfer between the fluids of two phases, a dividing section for simulating a divided flow of a portion of the fluids, and a merging section for simulating merging of a plurality of fluids, in order to simulate the case of a flow other than the normal flow using the dividing section and the merging section.

In other words, the simulation method is preferably performed by using a computer, and the program is stored in hard disk or the like, and executed. Here, the program, preferably distributed via storage media such as a CD-ROM or a floppy disk, can be distributed via on-line communication.

DETAILED DESCRIPTION OF PREFERRED EMBODIMENT

Figure 1:
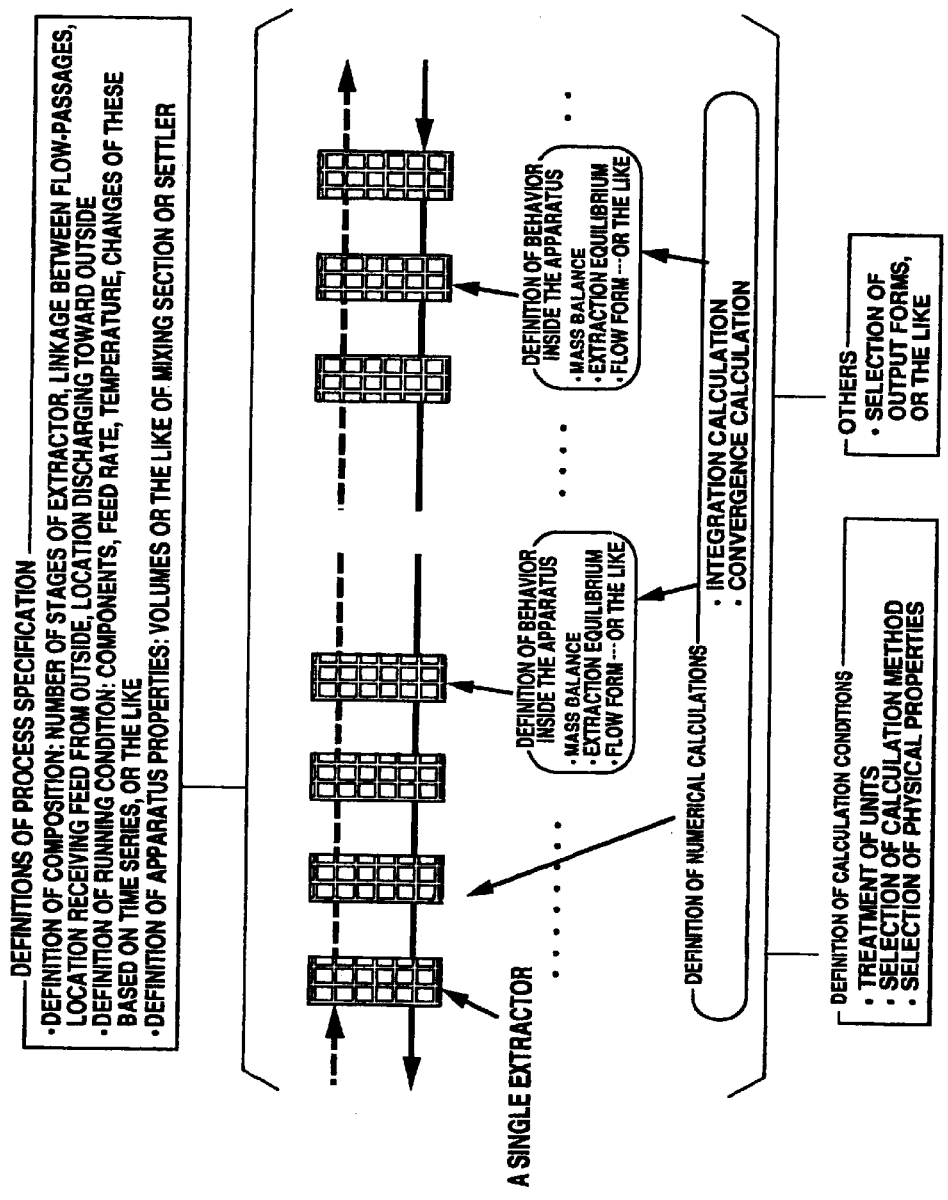
FIG. 1 is a diagram illustrating elements of a multistage extraction process calculation.

Hereinafter embodiments according to the present invention will be described with reference to the drawings.

0. OVERVIEW OF THE INVENTION

Firstly, the simulation method according to the present embodiment is not aimed at analyzing a fixed process but at processes with various structure, ranges and/or levels flexibly at various stages of research and development including from basics to equipment and/or processes, concept-building to designing of the plant, and operation test, and particularly relates to an object-oriented solvent extraction calculation program (hereafter referred to as code).

The simulation according to the present invention performs mainly valuations of the concentration profile under conditions in which abnormal fluid lows occur(occurrence of flows other than the normal flow) and a variety of valuations of dynamic characteristics.

The program according to the present invention comprises independent element models having functions for calculating equilibrium concentration and mass balance, simulating settlers, piping, division of a fluid flow, merging of fluid flows, and is capable of simulating various phenomena by combining these elements according to analytical events or manner of processes. Settlers and piping have there type of flow dynamic expressions according to complete mixing systems, piston flow systems, and transfer functions, then a variety of flow dynamic expressions are possible for settlers and piping by combining them. Besides, function expressions such as for volume or divided-flow ratio are built into the element models.

1. CONCEPT OF THE CODE

Code exists for extraction process calculation such as MIXSET. For details, see "Development of the Simulation Codes MIXSET and PULCO for the Solvent Extraction on the PUREX Process Reprocessing', by Miyachi and Masui, PNC Technical Review, No.76, P45–51, December 1990", described above. These codes mainly handle extraction equilibrium of U(Uranium)/Pu (Plutonium) and distribution reaction of Pu, in a normal flow state. For evaluation of the extraction process, on the other hand, needs which conventional code can not meet have been arising, such as concentration profile evaluation in abnormal fluid flows, dynamic treatment of extraction behavior, or consideration of process control. The present code, which is supposed to simulate a variety of events by combining the [element models], particularly includes powerful functions for flexibly handling arbitrary composition of flow passages. At present, a group of models that are supposed to express a system having a normal state as well as abnormal fluid flows (three types of abnormal phenomena) was developed, as equipment and process models combining the element models. This and the functions built in the element models, combined together, enable the following function, which is unprecedented.

concentration profile evaluation in abnormal fluid flows of the extractor in the event of occurrence of overflow, entrainment, reflux dynamic characteristics/transient response evaluation (Complete mixing system, piston flow system, transfer function expression, and combination of the three as expressions of flow patterns. Function expression of volume inside the apparatus depending on operation conditions.)

The substances to be handled in the following descriptions are nine components relating to extraction of U and Pu. Distribution of Pu can be handled by a similar method. Although data prepared by G. L. Richardson et al. are temporarily used for extraction equilibrium logic, it is preferable to study and compare with cases using other extraction equilibrium data, and to enhance the reliability by making necessary changes. Here, as for whether the [extraction equilibrium] element model reflects the built-in logic, it has been confirmed that numerical solution matches with that of MIXSET under a condition in which elements are set to be treated as the same in MIXSET.

2. OUTLINE OF THE CODE

In order to realize what is described in Sec.1, the concept of the code, conventional program languages used for scientific calculation such as FORTRAN are extremely limited. The present code is therefore written using Object DPS (institute of JUSE(the Japan Union of Science and Engineers)), general object-oriented software. For details, see "Recent trends of software technology in the chemical industry", No. 486, Vol. 40, 1995 extra edition of "Chemical Engineering", November, 1995, published by Kagaku Kogyo Sha.

A major feature of object-oriented software is that an apparatus can be composed on a graphic screen and a model has a hierarchical structure. Also, the whole of a huge process can generally be expressed as a combination of individual models of apparatuses, and the process characteristics can be evaluated by changing the composition, specification, or operation procedure of the apparatus on the screen.

In the present model, a [phenomenon] occurring in a single extraction apparatus is the minimum unit of an element of the model, which enables simulation of various phenomena in the extraction apparatus. Therefore, the essence of the present code is "modeling by composition elements and their combination to simulate a variety of phenomena." Needless to say, attention should be paid to express as many phenomena as possible by common composition elements.

2.1 Elements of Extraction Process Calculation

FIG. 1 shows composition elements of a multistage extraction process calculation. As can be seen, a plurality of extractors are connected, in which fluids of two phases are gradually moved along opposite directions to each other. i.e., in a counter current manner. Here, mass balance calculation and extraction equilibrium concentration calculation are the basic extraction operations at each stage.

If the modeling is to be done using languages such as FORTRAN, BASIC or the like, each stage and relating information, i.e., from defining of specification according to input data, to calculation process and output, must be written as a whole in the program as mathematical expressions.

Naturally, however, modeling beyond the range of composition (flow passage, number of stages or the like) assumed when designing the code is impossible.

Figure 2:
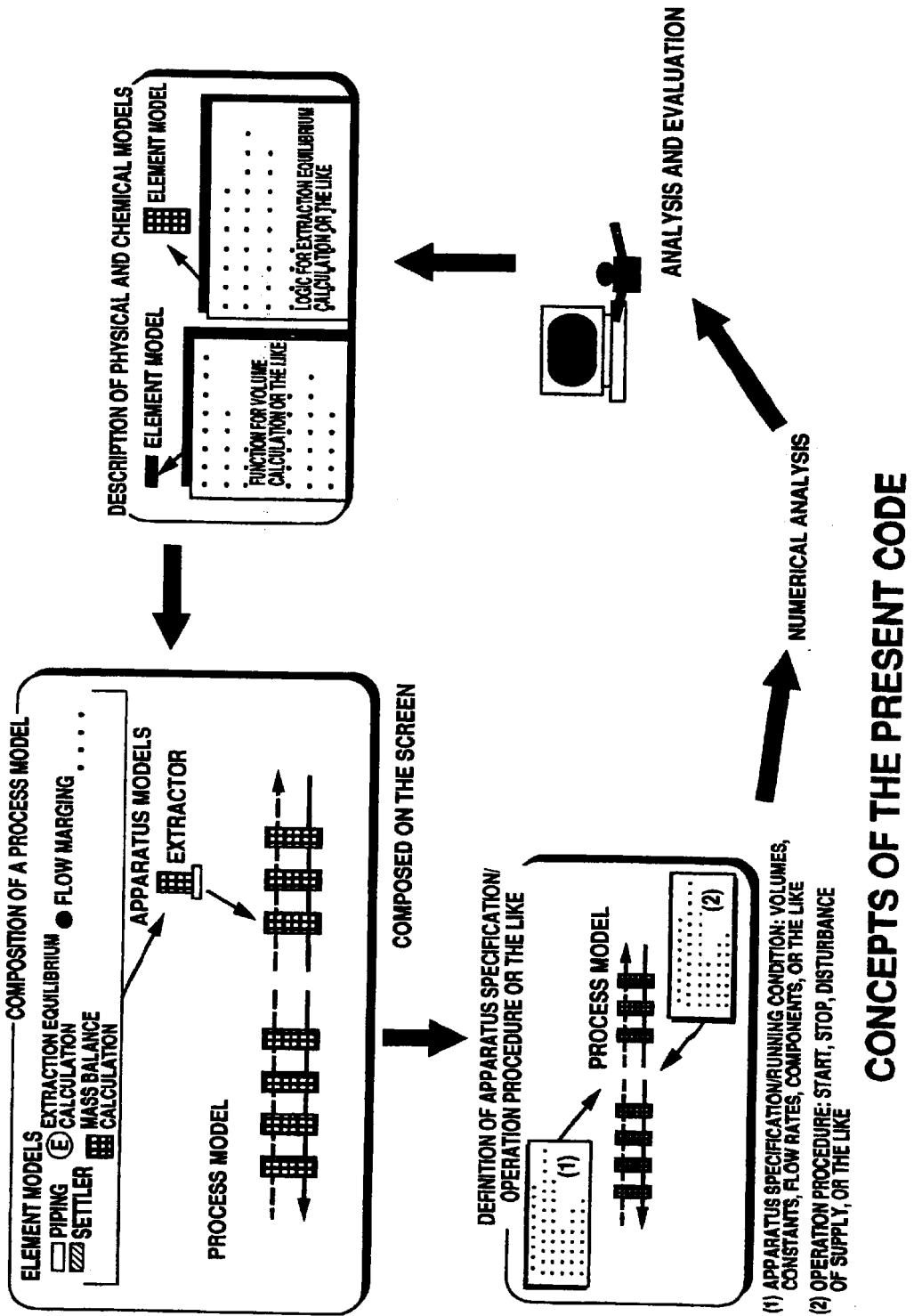
FIG. 2 is a diagram illustrating the concept of the code according to the present invention.

Additionally, it may be easy to imagine that modeling of abnormal events mentioned in Chapter1 (Sec.1 Idea of the code) becomes very difficult. FIG. 2 illustrates the concept of the code of the present invention. As shown, on the basis of events of interest for evaluation, process models are composed corresponding to element models for which physical or chemical models are associated. Then, equipment specifications and operation conditions having been defined, mathematical analysis is performed and the result is evaluated. Depending on the result, the physical or chemical models may be studied and modified if necessary. Composing the equipment and/or process is no longer a matter of wrestling with mathematical expressions but has become block-building on the graphic screen.

Thus, by appropriately composing minimum-unit element models, it has become possible to meet newly arising needs, as well to analyze experimental data or thought experiments on unknown events, by frequently changing the models in the course of the studies.

Hereafter element models, the concept of model composition, details of equipment and/or process models, and examples of analysis will be described.

2.2 Element Models and Model Structures (1) Elements of Apparatus Models

Figure 3:
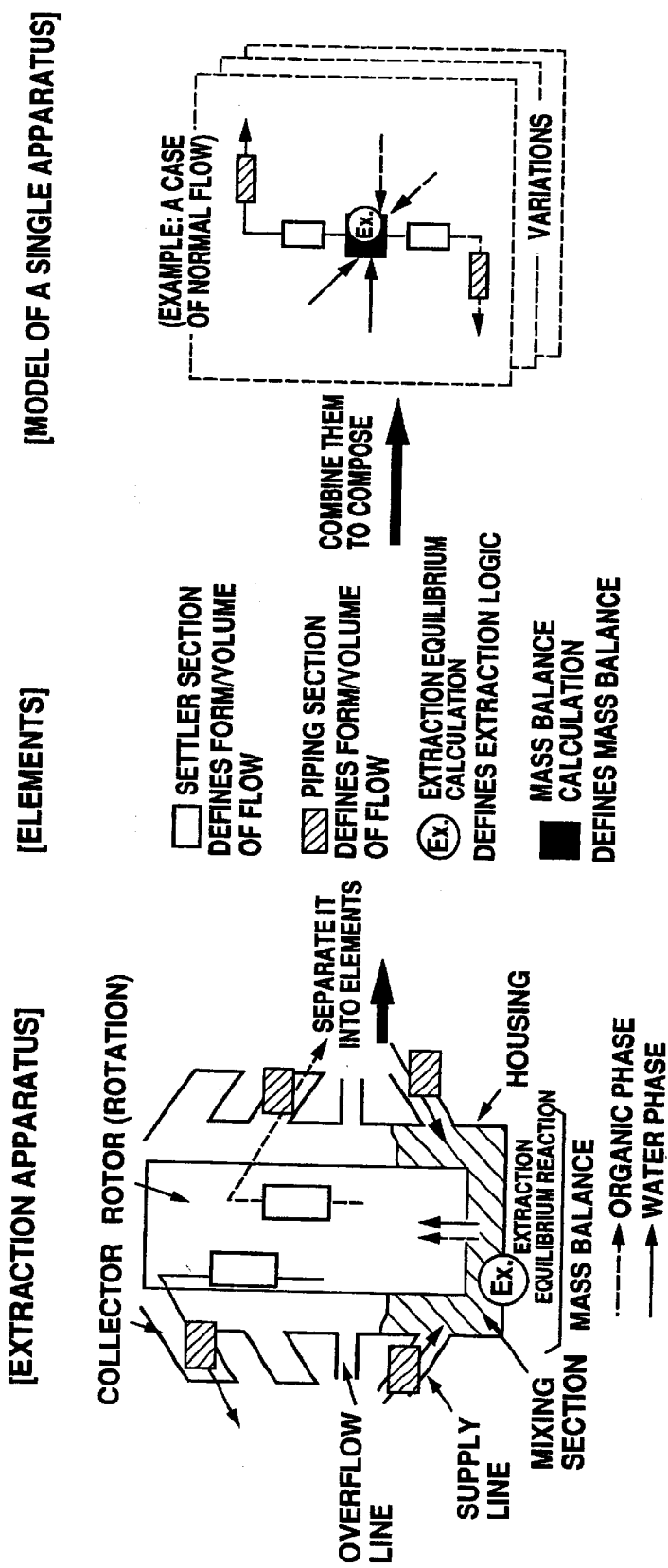
FIG. 3 is a diagram illustrating an element model of the apparatus.

FIG. 3 illustrates an element model of the apparatus. First of all, a brief explanation of the behavior inside the extractor will be given (The extractor shown in FIG. 3 is an example of a centrifugal extractor). Water phase/organic phase is supplied to the extractor from supply lines at both sides, mixed by rotation of a rotor in the gap between the rotor and a housing, and extraction reaction occurs. Both phases are separated in the rotor, discharged from each weir to a collector section, and supplied to a neighboring stage. Separation is performed to a necessary extent by preparing a multistage extractor.

In the present model, mass transfer is expressed by linkage of element models. The settler/piping defines the form and volume of the flow and calculates the change of each holdup. The mixing section in which extraction equilibrium reaction occurs is divided into portions for calculating equilibrium concentration and [mass balance], respectively. Thus only the element which handles [equilibrium concentration] has to be obtained when changing the logic of extraction reaction, and only the element which handles mass balance has to be obtained when changing the specification of the apparatus such as the number of fluid flows coming in or out. A model of a standard apparatus shown at the right of FIG. 3 is composed by assembling the elements according to the fluid flows.

(2) Simulation of Abnormal Fluid Flows

Figure 4:
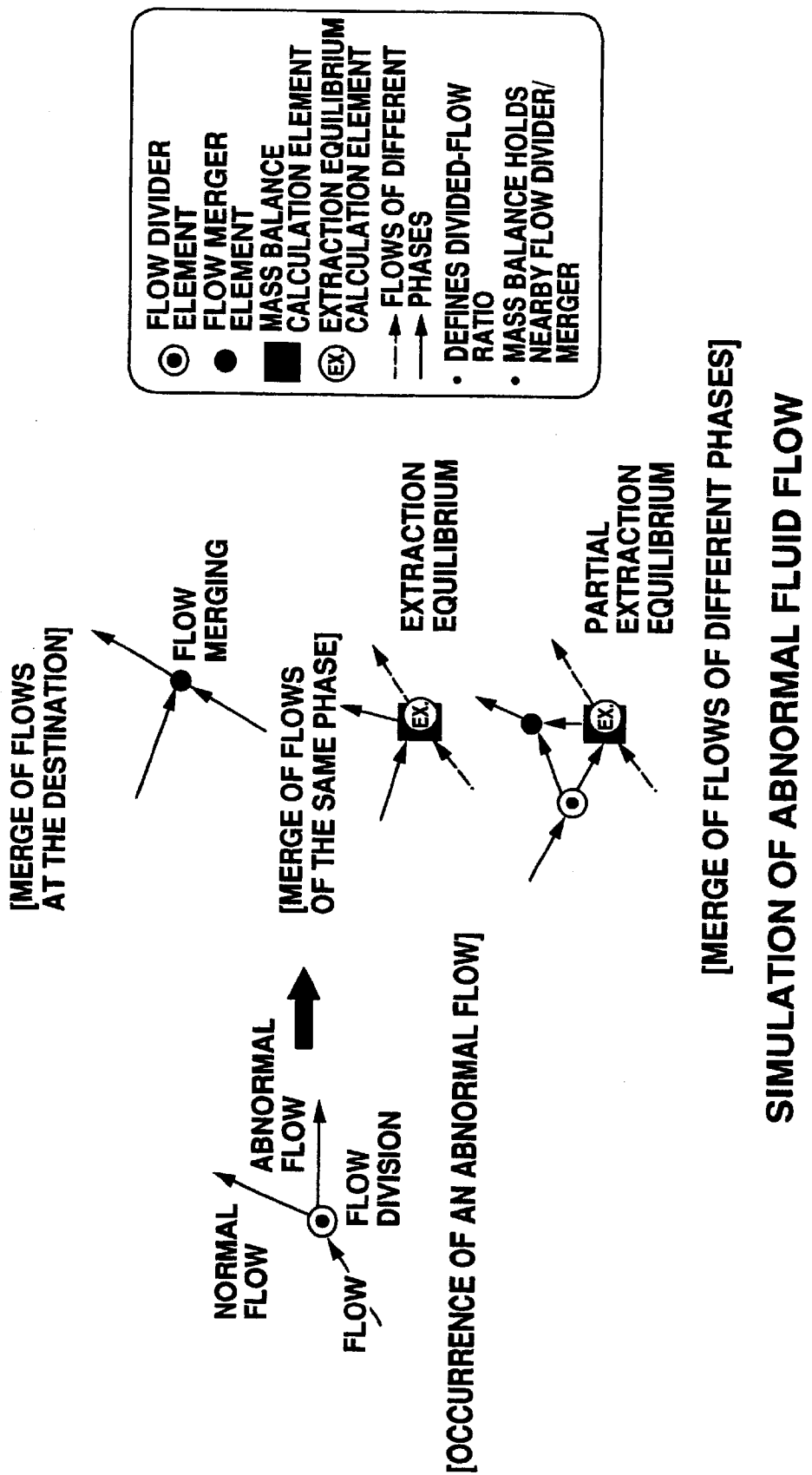
FIG. 4 is a diagram illustrating a simulation of abnormal flow of the fluid.

FIG. 4 illustrates a simulation of abnormal fluid flows. An abnormal fluid flow is a situation in which either a portion or the whole of the fluid flows through a different path from the normal flow passage. Here, to flow through a different path means a portion or the whole of the fluid divides from the normal flow passage and merges at the goal or goes out of the system. In the case of merging at the goal, only the mass balance is preserved if the flows are in the same phase, while the mass balance is preserved after extraction equilibrium of a portion or the whole of the fluid is reached if the flow merges with those in different phases.

Besides, the mass balance is naturally preserved around the flow divider too.

Therefore element models for dividing or merging the flows are introduced, and assumed abnormal events of fluid flows can be simulated, by combining the models appropriately. The basic function of the created flow divider model is such that a portion or the whole of the fluid is divided (flow rate is divided) with a determined divided-flow ratio ($0 \leq$ divided-flow ratio $\leq 1$). The basic function of the flow merger is to unify the in-coming streams (the mass flow is summed). The element models for calculating equilibrium concentration and mass balance can be used for extraction equilibrium at merging, and simulation is performed by combining them with the dividing/merging models.

Thus, by adding element models with the two functions, dividing and merging, a variety of abnormal flows can be simulated. In chapter 3 (3. Contents of the models), each abnormal flow is simulated by appropriately combining the models according to events of interest.

(3) Element Models

The element models according to the present code are listed in Table 1.

calculation of the functions of the entire model is executed, where boundary conditions/operation procedure is given. Therefore, when changing the analytical expression of the model, basically only the element model (element) file need to be modified.

Figure 5:
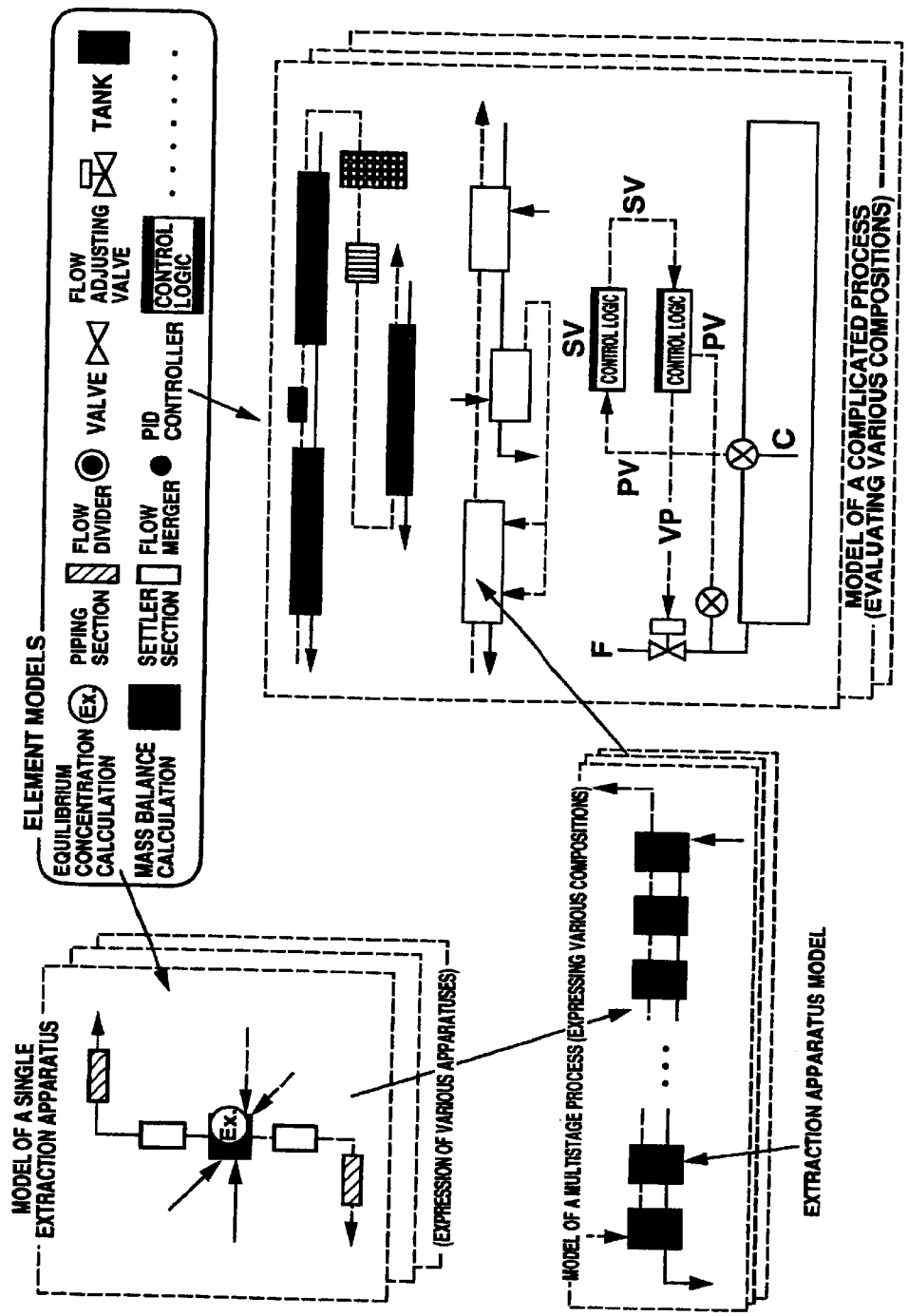
FIG. 5 is a diagram illustrating a composition of the process.

FIG. 5 illustrates the concept of the composition of a process model. An apparatus model is composed by combining element models, a process model is composed by combining apparatus models and element models, and a complicated process model is composed by combining a plurality of process models and element models. Thus, an apparatus or a process model according to an arbitrary specification can be composed by "combining" upper models including element models and multi-element models.

Therefore, whereas conventional code has limitations on composition or number of flow-passages due to specifications when designing the code, the present model is basically freed from such restrictions.

Besides, calculation can be performed, either in a single element model or in any of the intermediate or upper model unit including a single extraction apparatus model, thus facilitating composition of a model by performing calculation and confirming the feature at each stage. Copies of a model in each stage/variation can be stored, if necessary, to be executed alone, modified, or used in part when composing a new model. Therefore, the so-called model specification (number of banks, number of extractors, flow-passage composition or the like) concept in conventional codes does not exist in the present system. In other words, element models in Table 1 are the skeleton, common specification of

TABLE 1

ELEMENT MODEL(ELEMENT)

| ELEMENT MODEL (ELEMENT) | ELEMENT NAME | VARIATION | |
|---|---|---|---|
| EQUILIBRIUM CONCENTRATION EXPRESSION CALCULATION | EXTRACT# | STATE EFFICIENCY FUNCTION | |
| MASS BALANCE CALCULATION | PULSSTG# | VOLUME FUNCTION EXPRESSION | |
| SETTLER SECTION | SETTLER# | VOLUME FUNCTION EXPRESSION | COMPLETE MIXING/PISTON FLOW/TRANSFER FUNCTION MODEL |
| PIPING SECTION | PIPP# | VOLUME FUNCTION EXPRESSION | |
| FLOW DIVIDER | #SPLIT# | DIVIDED RATIO FUNCTION EXPRESSION | |
| FLOW MERGER | STAD# | | |

In the present code, each element model (element) is given a name as listed in the table. There are variations associated with functions as listed in the table, which can be distinguished by numbering on the # part. (An element is not given multiple functions but made simple with basically a single function, thus an element with a necessary function is supposed to be used according to the purpose. This is in order to lighten the burden of the user by simplifying the condition setting at execution, and to decrease the possibility of mistakes in setting.)

(4) Composition of Process Models

Once the element model is defined, the process can easily be assembled on the PC screen of a personal computer according to the event to be analyzed and the process composition. Functions characterizing the features of each element are stored in the element model (element) file, and the present code, and the model specification] simulated by combination of these models exists corresponding to the evaluation target to be analyzed.

3. CONTENTS OF THE MODELS 3.1 Ordinary Models

These are models of the case in which the fluid is flowing normally. The models are described in the beginning because they will be used as the base of models of abnormal fluid flow phenomena described later.

3.1.1 Models (1) Apparatus Model

Figure 6:
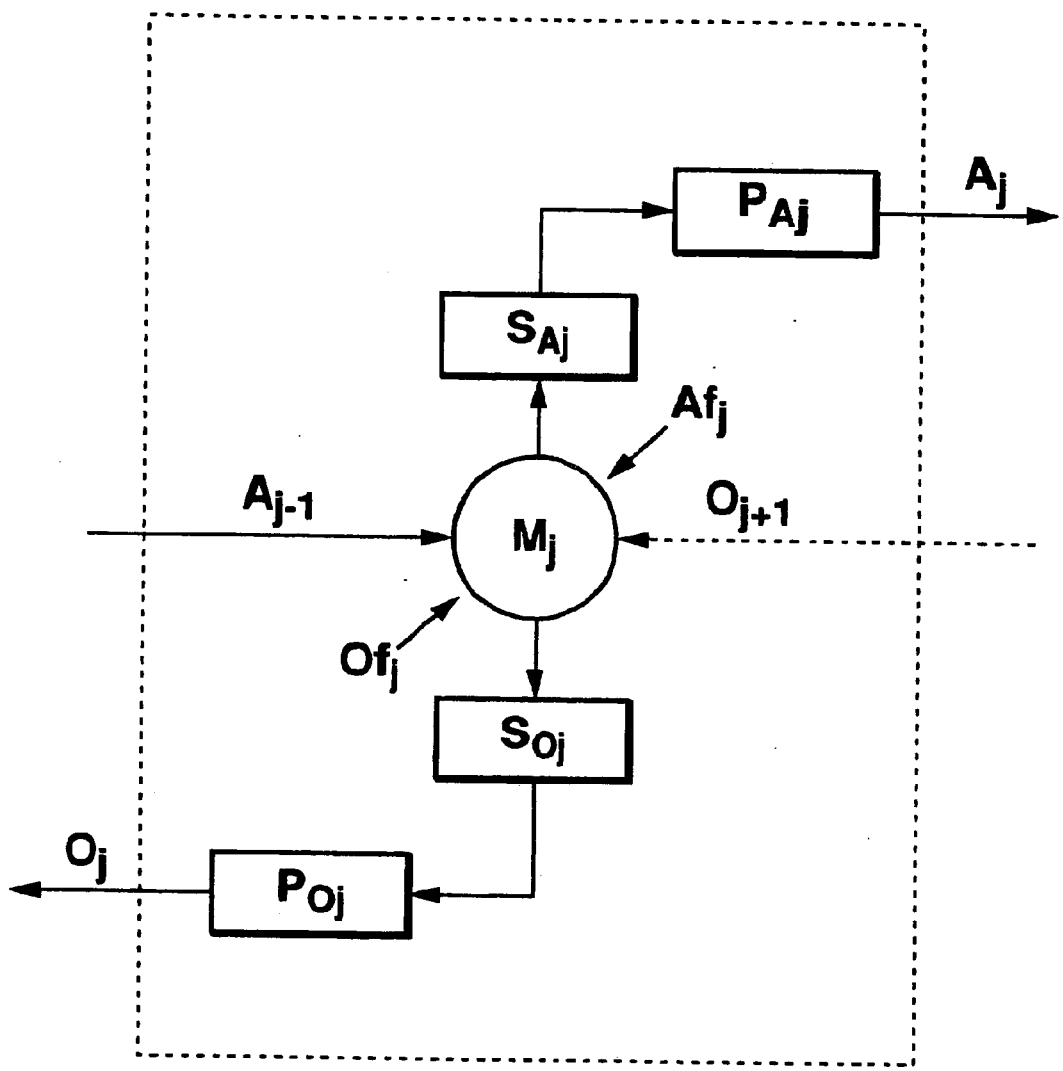
FIG. 6 is a diagram illustrating an extraction apparatus model (ordinary type).

FIG. 6 illustrates an apparatus model. Correspondence with the extractor is as shown in FIG. 3. [M] in FIG. 3 is the mixing section, being a combined model of element models (referred to as elements hereafter) EXTRACT# and PULSSTG#. [S] and [P] are the settler and piping respectively, and either variation SETTLER# or PIPP# of the elements will be used according to the purpose (these symbols will be used in the model drawings hereinafter).

The followings are functions not existing in MIXSET in an ordinary model.

capability of expressing the volumes of the mixing section/settler/piping section in either organic or water phase as a function.

capability of expressing the stage efficiency as a function of residence time.

capability of adding a piping section to the model.

capability of the following simulations of flow status of fluids in the settler and the piping section:

expression by "piston flow model"

expression as "a continuous body of a plurality of complete mixing models"

expression as "an arbitrary combination of piston flows and complete mixing"

expression by "first-/second-order lag by transfer function" as integrated settler/piping section.

The above features will become important when analyzing transient characteristics of an extraction process.

(2) Process Model

Composed by a combination of apparatus models. The concept is as shown in FIG. 5.

(3) Substances to be Handled

The substances to be handled in the present code are the following nine components in the reprocessing PUREX process.

Water phase components: $HNO_3$, $UO_2(NO_3)_2$, $Pu(NO_3)_4$, $H_2O$, Organic phase components: $HNO_3 \cdot TBP$, $UO_2(NO_3)_2 \cdot 2TBP$, $Pu(NO_3)_4 \cdot 2TBP$ TBP, n-dodecane (TBP: tributyl phosphate, abbreviation used hereafter.)

Although not described in the explanation, Pu distribution reaction can be handled on the basis of an element model, already developed for calculating the chemical reaction, extraction equilibrium including $Pu^{3+}$ and $U^{4+}$, and [mass balance concerning Pu distribution reaction.

3.1.2 Mathematical Model

A basic mathematical model of the present model will be described below. Firstly the variables will be described (see FIG. 6 for location of flows).

Notations used here are, $Vaj$: water phase volume in mixing section, $xi,j$: water phase concentration, $Voj$: organic phase volume in mixing section, $yi,j$: organic phase concentration, $Aj$: water phase flow rate, $Oj$: organic phase flow rate, $Afj$: water phase supply flow rate, $xfi,j$: water phase concentration of $Afj$ flow, $Ofj$: organic phase supply flow rate, $yfi,j$: organic phase concentration of $Ofj$ flow, $Di,j$: distribution coefficient, i: component symbol, j: stage symbol.

The i-th component in the j-th stage is expressed as follows:

$$Vaj \cdot dxi,j/dt + Voj \cdot dyi,j/dt = Aj-1 \cdot xi,j-1 + Oj+1 \cdot yi,j+1 + Afj \cdot xfi,j + Ofj \cdot yfi,j - Aj \cdot xi,j - Oj \cdot yi,j \quad (3.1-1)$$

(This is the mass balance in the mixing section, indicating that inflow-outflow between dt is equal to the change of holdup amount.)

$$yi,j = Di,j \cdot xi,j \quad (3.1-2)$$

$$Di,j = fi(xi,j) \quad (3.1-3)$$

(This indicates the extraction equilibrium relation of concentrations of water and organic phases, expressing it as a function of water phase concentration. For details of the function, see ["CALCULATION CODE REVISED MISET FOR PUREX PROCESS" by Gonda, PNCT 841-79-26, Febuary 1979].

By solving the equation for the i-th component at the j-th stage, with the above given as the boundary condition (operation condition), concentration of each component at each stage can be obtained. Here, in the settler/piping, [increased rate=in-out] holds for each stage.

3.1.3. Composition Element Models (1) Mixing Section

Composed of two elements, PULSSTG and EXTRACT (The # indicating each variation will be omitted hereinafter).

PULSSTG: Calculates mass balance. Functions for volumes of water or organic phases in the mixing section are defined here.

EXTRACT: Calculates equilibrium concentration of each component in both phases. Apparent equilibrium constant is expressed by a function of $NO_3$-concentration and TBP volume percentage. Data by G. L. Richardson et. al. is temporarily used in the present version G. L. Richardson and J. L. Swanson, "Plutonium Partitioning in the PUREX Process with Hydrazine-Stabilized Hydroxylamine Nitrate", HEDL-TME-75-31, 1975]. Here, this is the same as the case of Revised MIXSET [Gonda, " CALCULATION CODE REVISED MISET FOR PUREX PROCESS" by Gonda, PNCT 841-79-26, Febuary 1979]. Different extraction equilibrium data can be expressed by rewriting this part.

Function expression of the stage efficiency is defined here.

(2) Settler

Modeled in element SETTLER. Functions for volumes of water or organic phases in the settler section are defined here.

(3) Piping

Modeled in element PIPP. Functions for volumes of water or organic phases in the piping section are defined here.

(4) Expression of the Settler/Piping by Transfer Function

Modeled in elements LTRANSC (second-order lag) and LTRANSC1 (first-order lag). Transient response of each component at the piping exit is expressed by first- and second-order lag systems according to input values to the settler entrance. The present function expression is prepared for studies of expressing transient response of the entire process as a combination of transfer functions.

3.1.4. Apparatus/Process Model

Transient state is calculated by integrating the holdup quantity from [in-out] with a predetermined$\Delta t$ interval. The steady state is when [in-out] remains constant.

3.2. Overflow Model 3.2.1. Overflow Phenomenon

Figure 7:
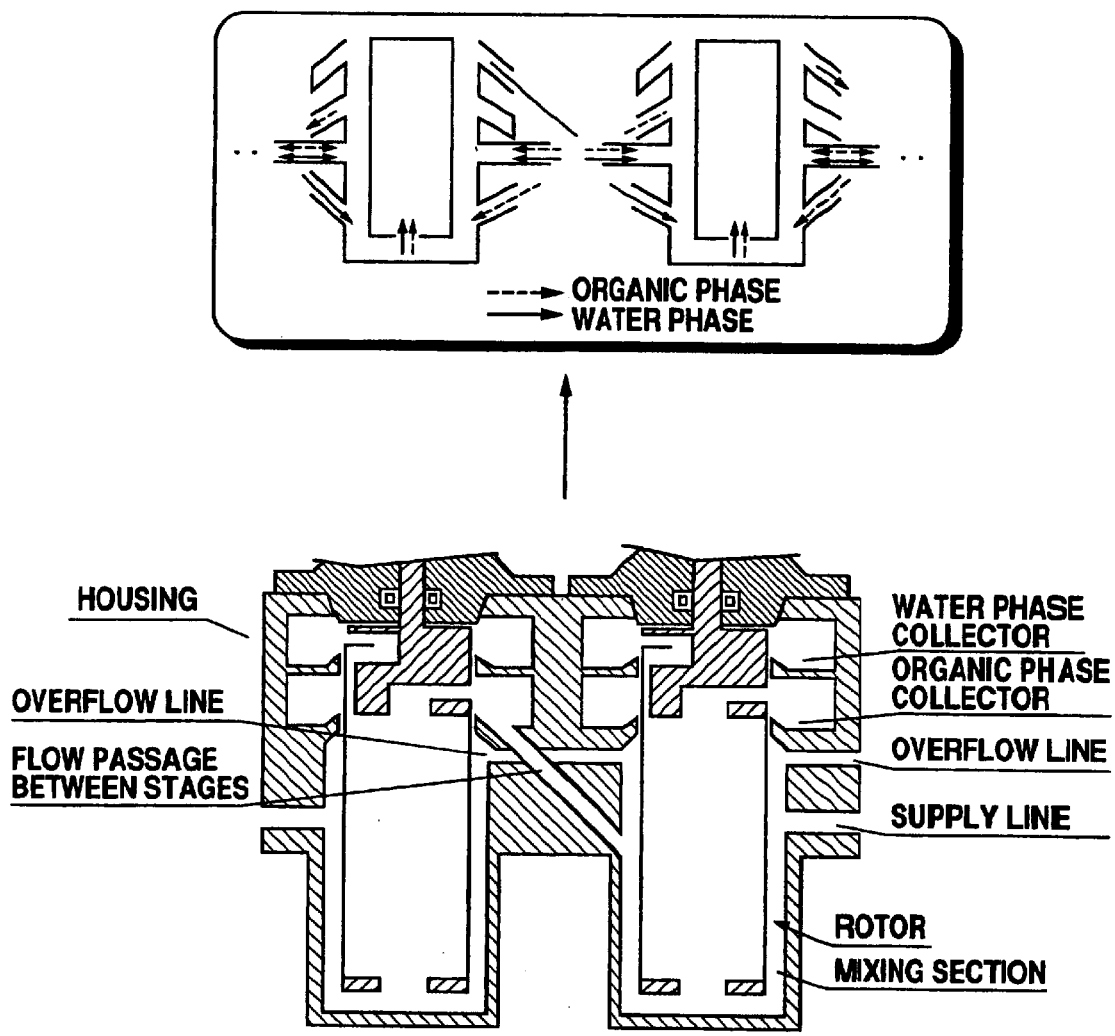
FIG. 7 is a diagram illustrating a cross section of the centrifugal extractor.

FIG. 7 illustrates a schematic diagram of a cross section of a centrifugal extractor. The present phenomenon is such that a portion or the whole of the water/organic phases flows out from the overflow line to the next stage, whereas the fluid in the water/organic phases flows to the next stage via the collector section in a normal operation state.

In the case described above, the concentration profile at each stage changes compared with that of the normal operation state. Although there has not been a means for evaluating the concentration profile in this case, the present invention performs the evaluation of this case.

3.2.2. Model

Figure 8:
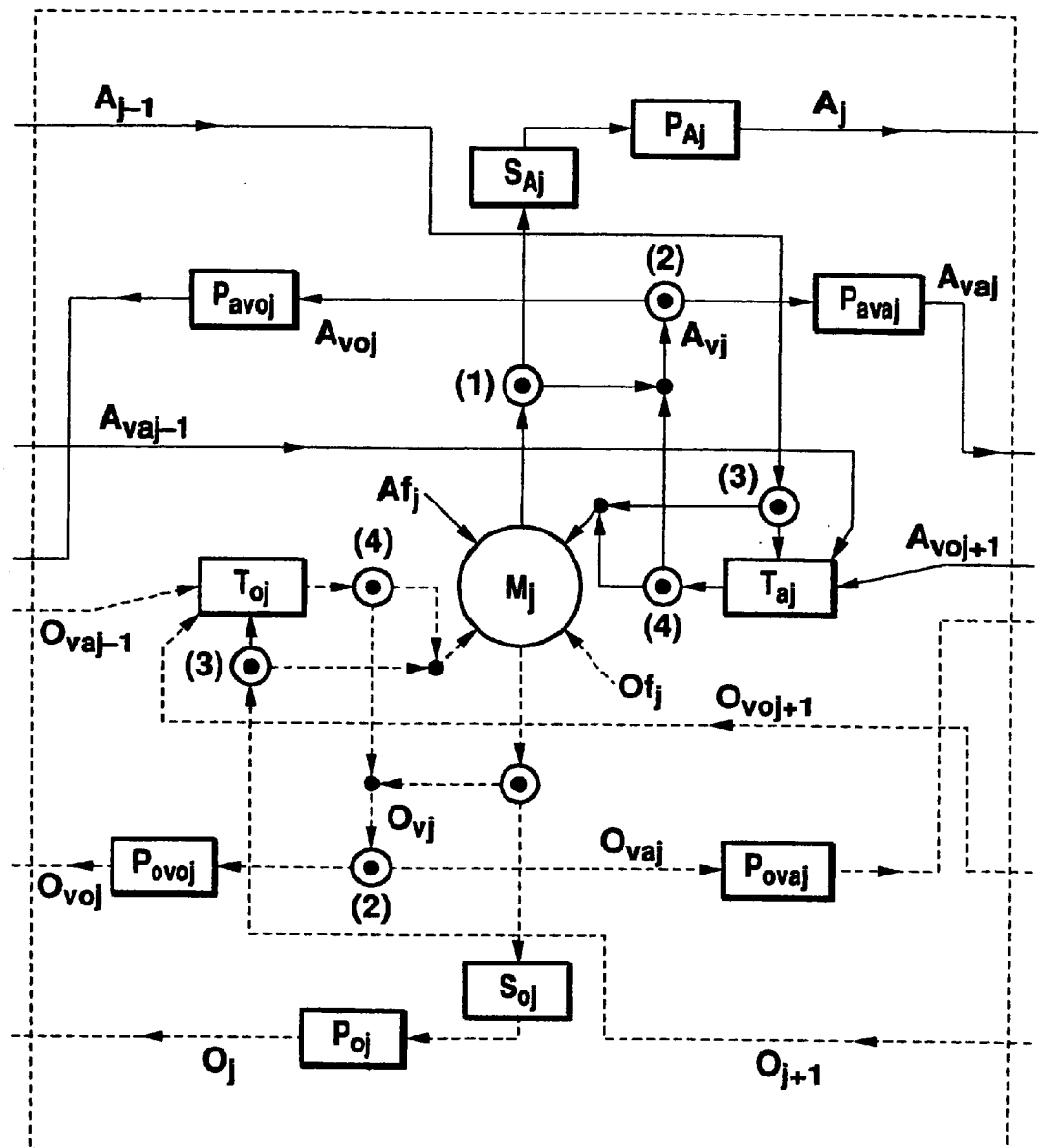
FIG. 8 is a diagram illustrating a model of the overflow type.
Figure 9:
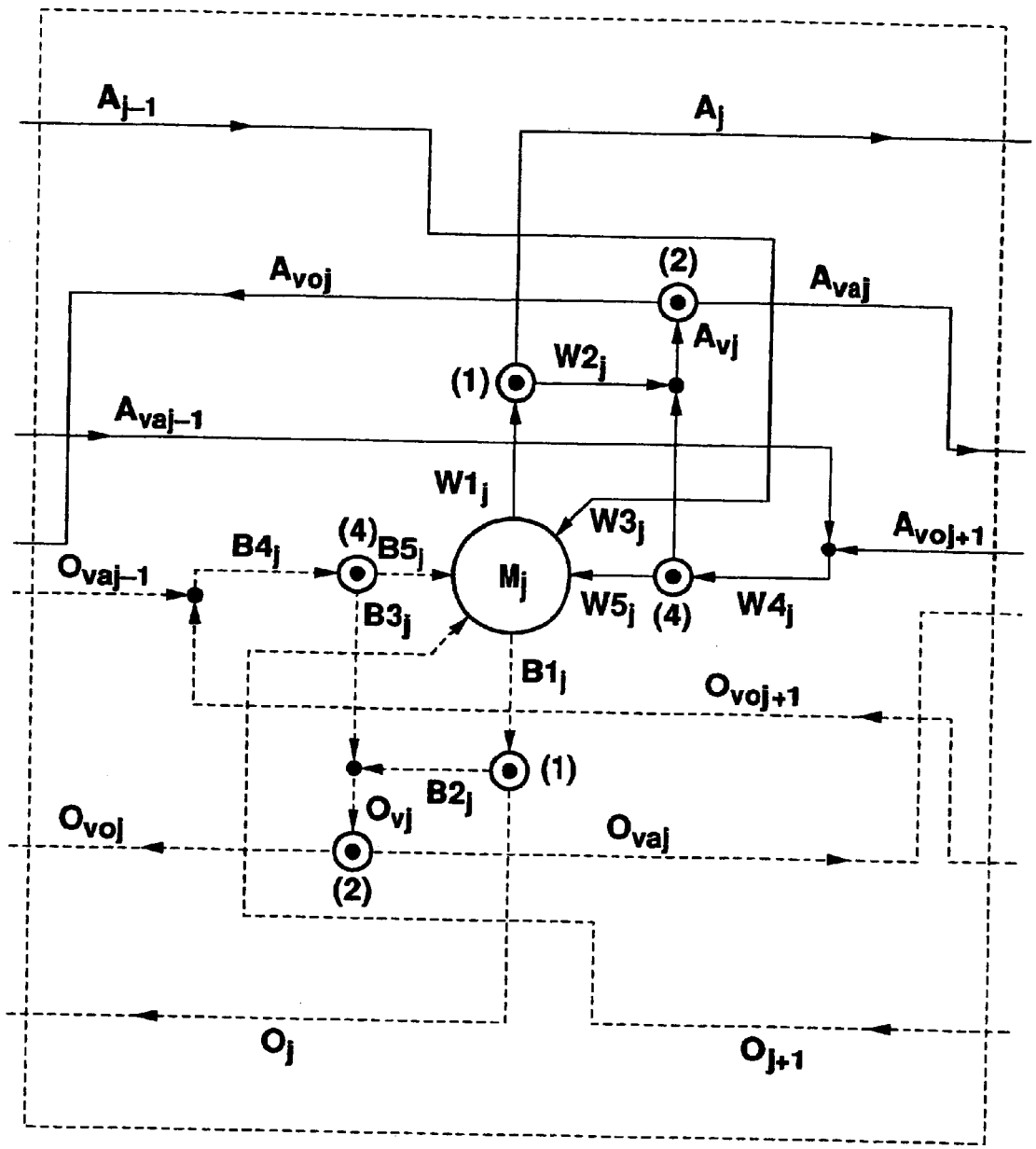
FIG. 9 is a diagram illustrating a model of the overflow type (for calculating steady state).

Models as illustrated in FIGS. 8 or 9 can be composed by expressing the above phenomena as connections between element models (one for a single extractor is shown). The model in FIG. 9 is for calculating the steady state. (Because the steady state gives the same solution as in FIG. 8, not having to consider the volumes of settler/piping/tank, a model without these elements can be used for analysis focusing on the steady state). The present model expresses the following events by changing the divided-flow ratio in each flow divider (see FIG. 9).

An overflow is generated in a flow divider (1). The direction of the overflow is set by a flow divider (2). When extraction reaction of the overflow in the mixing section incomplete, a flow divider (4) simulates the extent to which it is incomplete.

By connecting models, each of which corresponds to a single extractor, and appropriately setting divided-flow ratio of each flow divider, a multistage process model can be defined for generating overflow at an arbitrary stage (including generation at continuous stages) and toward an arbitrary direction.

3.2.3 Mathematical Model

The basic mathematical model of the present model will be described below. The model is an enhancement of an ordinary mathematical model in that it takes into account balance close to divided flows and/or merged flows (as is the case with the two abnormal flow models described later). The variables will be described first. (for the location of flow rate, see FIG. 9).

i: component symbol, j: stage symbol, Vaj: water phase volume in mixing section, xi,j: water phase concentration in mixing section/water phase concentration at extractor outlet (normal line), Voj: organic phase volume in mixing section, yi,j: organic phase concentration in mixing section/organic phase concentration at extractor outlet (normal line), Aj: water phase flow rate (normal line), Oj: organic phase flow rate (normal line), Di,j: distribution coefficient, W1j: water phase flow rate from mixing section to flow divider (1), B1j: organic phase flow rate from mixing section to flow divider (1), W5j: water phase flow rate from flow divider (4) to mixing section, B5j: organic phase flow rate from flow divider (4) to mixing section, xw5i,j: water phase concentration of W5j flow, yb5i,j: organic phase concentration of B5j flow, W2j: water phase flow rate from flow divider (1) to flow merger ●, SD1aj: divided-flow ratio of water phase flow divider (1) to flow merger ●, B2j: organic phase flow rate from flow divider (1) to flow merger ●, SD1oj: divided-flow ratio of organic phase flow divider (1) to flow merger ●, W3j: water phase flow rate from flow divider (4) to flow merger ●, xw3i,j: water phase concentration of W3j flow, Avj: water phase flow rate from merger ● to flow divider (2), xavi,j: water phase concentration of Avj flow, B3j: organic phase flow rate from flow divider (4) to flow merger ●, yb3i,j: organic phase concentration of B3j flow, Ovj: organic phase flow rate from merger ● to flow divider (2), yovi,j: organic phase concentration of Ovj flow, Avaj: water phase overflow rate toward water phase flow, SD2aj: divided-flow ratio of water phase flow divider (2) toward j+1th stage, Avoj: water phase overflow rate toward organic phase flow, Ovaj: organic phase overflow rate toward water phase flow, Ovoj: organic phase overflow rate toward organic phase flow, SD2oj: divided-flow ratio of organic phase flow divider (2) toward j−1th stage, W4j: water phase flow rate from flow merger ● to flow divider (4), xw4i,j: water phase concentration of W4j flow, SD4aj: divided-flow ratio of water phase flow divider (4) toward mixing section [M], B4j: organic phase flow rate from flow merger ● to flow divider (4), yb4i,j: organic phase concentration of B4j flow, SD4oj: divided-flow ratio of organic phase flow divider (4) toward mixing section [M].

Concentration does not change through the flow divider and concentration of each phase from the flow merger depends on mass balance. Therefore the i-th component in the j-th stage will be given as follows:

nearby the mixing section [M] similar to the concept of the normal model $$Vaj \cdot dx_{i,j}/dt + Voj \cdot dy_{i,j}/dt = Aj-1 \cdot x_{i,j-1} + Oj+1 \cdot y_{i,j+1} + W5j \cdot xw5_{i,j} + B5j \cdot ybw5_{i,j} - W1j \cdot x_{i,j} - B1j \cdot y_{i,j} \quad (3.2\text{-}1)$$

(Mass Balance in Mixing Section Between dt)

Because yi,j=Di,j·xi,j and Di,j=fi(xi,j), being the same extraction system, they are the same as (3.1-2) and (3.1-3).

nearby the flow divider (1): water phase $$W1j \cdot x_{i,j} = (Aj+W2j) \cdot x_{i,j} \quad (3.2\text{-}2)$$

$$W2j = SD1aj \cdot W1j \quad (3.2\text{-}3)$$

nearby the flow divider (1): organic phase $$B1j \cdot y_{i,j} = (Oj+B2j) \cdot y_{i,j} \quad (3.2\text{-}4)$$

$$B2j = SD1oj \cdot B1j \quad (3.2\text{-}5)$$

nearby the flow merger ●: water phase (merged from the flow dividers (1) and (4))

$$W2j \cdot x_{i,j} + W3j \cdot xw3_{i,j} = Avj \cdot xav_{ij} \quad (3.2\text{-}6)$$

(Avj corresponds to water phase portion of generated overflow)

nearby the flow merger ●: organic phase (merged from the flow dividers (1) and (4))

$$B2j \cdot y_{i,j} + B3j \cdot yw3_{i,j} = Ovj \cdot yav_{ij} \quad (3.2\text{-}7)$$

(Ovj corresponds to organic phase portion of generated overflow)

nearby the flow divider (2): water phase $$Avj \cdot xav_{i,j} = (Avaj+Avoj) \cdot xav_{i,j} \quad (3.2\text{-}8)$$

$$Avaj = SD2aj \cdot Avj \quad (3.2\text{-}9)$$

nearby the flow divider (2): organic phase $$Ovj \cdot yav_{i,j} = (Ovaj+Ovoj) \cdot yav_{i,j} \quad (3.2\text{-}10)$$

$$Ovaj = SD2oj \cdot Ooj \quad (3.2\text{-}11)$$

nearby the flow merger ●: water phase (merging overflow from neighboring stage)

$$Avaj-1 \cdot xav_{i,j-1} + Avoj+1 \cdot xav_{i,j+1} = W4j \cdot xw4_{i,j} \quad (3.2\text{-}12)$$

nearby the flow merger ●: organic phase (merging overflow from neighboring stage)

$$Ovaj-1 \cdot yov_{i,j-1} + Ovoj+1 \cdot yov_{i,j+1} = B4j \cdot yb4_{i,j} \quad (3.2\text{-}13)$$

nearby the flow divider (4): water phase $$W4j \cdot xw4_{i,j} = (W5j+W3j) \cdot xw4_{i,j} \quad (3.2\text{-}14)$$

$$W5j = SD4aj \cdot W4j \quad (3.2\text{-}15)$$

nearby the flow divider (4): organic phase $$B4j \cdot yb4i,j = (B5j + B3j) \cdot yb4i,j \quad (3.2\text{-}16)$$

$$B5j = SD4oj \cdot B4j \quad (3.2\text{-}17)$$

Concentration does not change when the flow is divided, xw3i,j and yb3i,j in expressions (3.2-6) and (3.2-7) will be as follows:

$$xw3i,j = xw4i,j \text{ and } yb3i,j = yb4i,j \quad (3.2\text{-}18)$$

According to foregoing expressions, concentration of each component i of each flow described above can be obtained for all stages from boundary conditions (operation conditions) if divided-flow ratio is given as a constant or a function of variables appearing in the above-mentioned expressions. (Here, if settlers and/or piping exist, the expression [increased flow rate=in−out] holds for each.)

Besides, as the mathematical model described above suggests, a series of similar expressions hold when flow passage is made complicated by adding divided flows or merged flows in FIG. 9, and concentration profile of each stage or concentration of branched flow can thereby be calculated (likewise in FIG. 8). Similar expressions hold for the two abnormal flow models described later.

3.2.4 Composition Element Models

It is needless to say that the same elements as those for normal flow models can be used for mass balance/extraction equilibrium calculation, settlers, and piping of the mixing section. Here, element models for divided flows and merged flows need to be newly defined.

(1) Flow Divider
Described in FIG. 9

Flow divider (1): Generates overflows. The divided-flow ratio, given by the user, defines the rate of the overflow to be generated.

Flow divider (2): Sets the proportion of the overflow which flows toward the organic phase flow to left in FIG. 9 or the water phase flow to right in FIG. 9. The divided-flow ratio, given by the user, defines the rate and direction of the overflow to be generated.

Flow divider (4): Sets the proportion of the overflow from neighboring stages which will be involved in the extraction reaction in the mixing section. The divided-flow ratio, given by the user, defines the proportion of the overflow to be involved in the extraction reaction in the mixing section.

The divided-flow ratio of above-mentioned flow dividers are given as follows:

$$F1 = Fin \cdot D, \ F2 = Fin - F1 \quad (3.2\text{-}19)$$

where
F1: flow rate toward defined direction, Fin: flow rate supplied to the flow divider, F2: flow rate outward of defined range, D: divided-flow ratio(−) (0.0 ≦D≦1.0)

(2) Flow Merger

Used at the section where streams merge, and has a function of adding mass flow rate.

(3) Tank (FIG. 8)

Has the same function as the flow merger, except that the capacity thereof is defined. Internally it is a complete mixing model.

3.2.5. Apparatus/Process Model

The calculation method is similar to that of the normal type model described in section 3.1. Conditions for obtaining a solution are satisfied by only defining divided-flow ratio at locations where divided flows will occur.

3.3. Entrainment Model
3.3.1. Entrainment Occurrence Phenomenon

Figure 10:
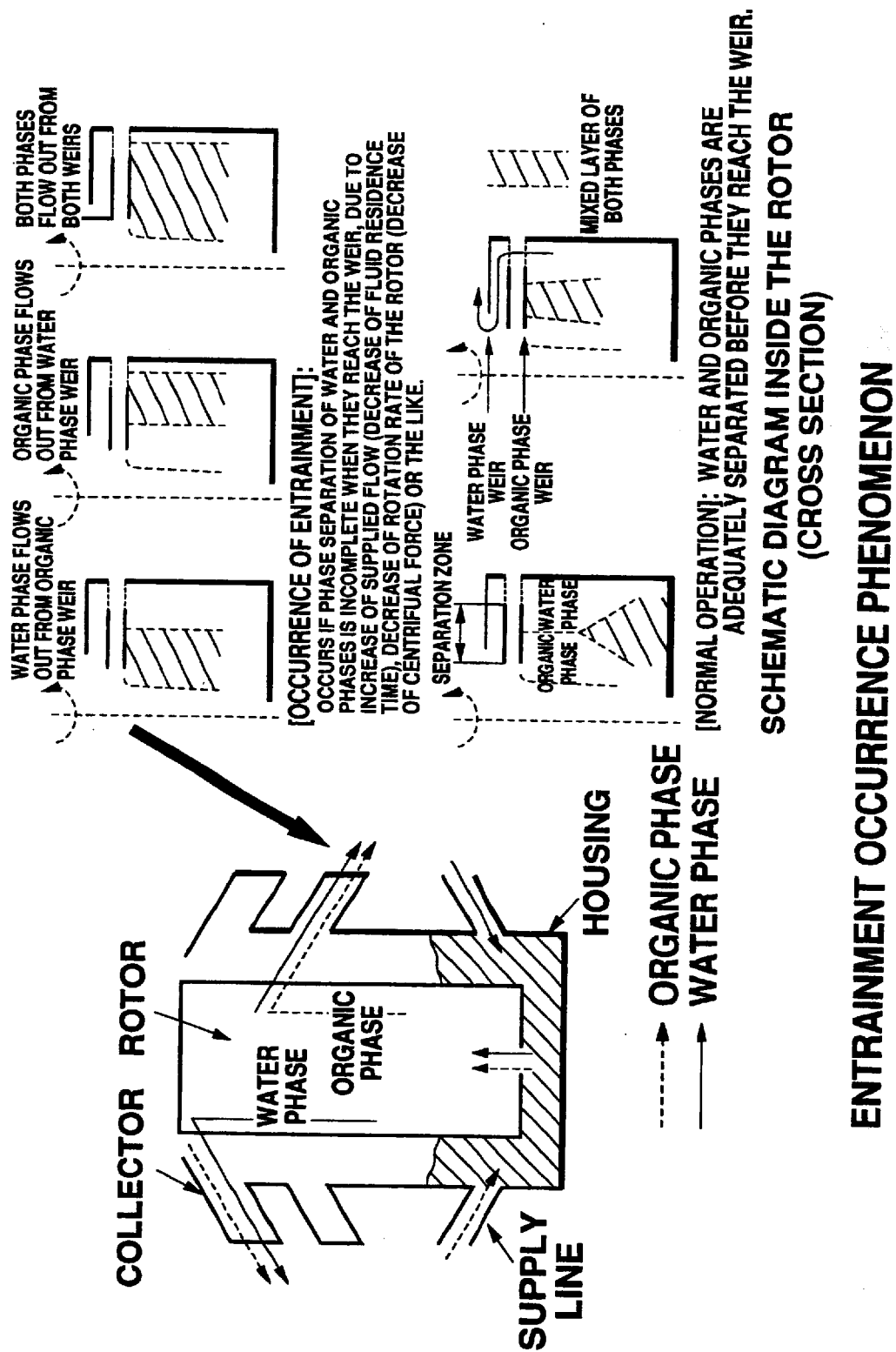
FIG. 10 is a diagram illustrating an entrainment phenomenon.

FIG. 10 is a schematic diagram of an entrainment occurrence phenomenon. The phenomenon is such that either a portion of water phase flow flows out from the outlet of organic phase or a portion of organic phase flow flows out from the outlet of water phase due to incomplete phase separation, whereas water phase and organic phase flows, being separated in the rotor, flow out from respective outlets in a normal operation condition. (The flowing out is called entrainment.)

When entrainment occurs, the concentration profile at each stage differs from that in the case of a normal operation condition. Although there had not been a method for evaluating concentration profiles in such cases, the present model provides an evaluation.

3.3.2. Model

Figure 11:
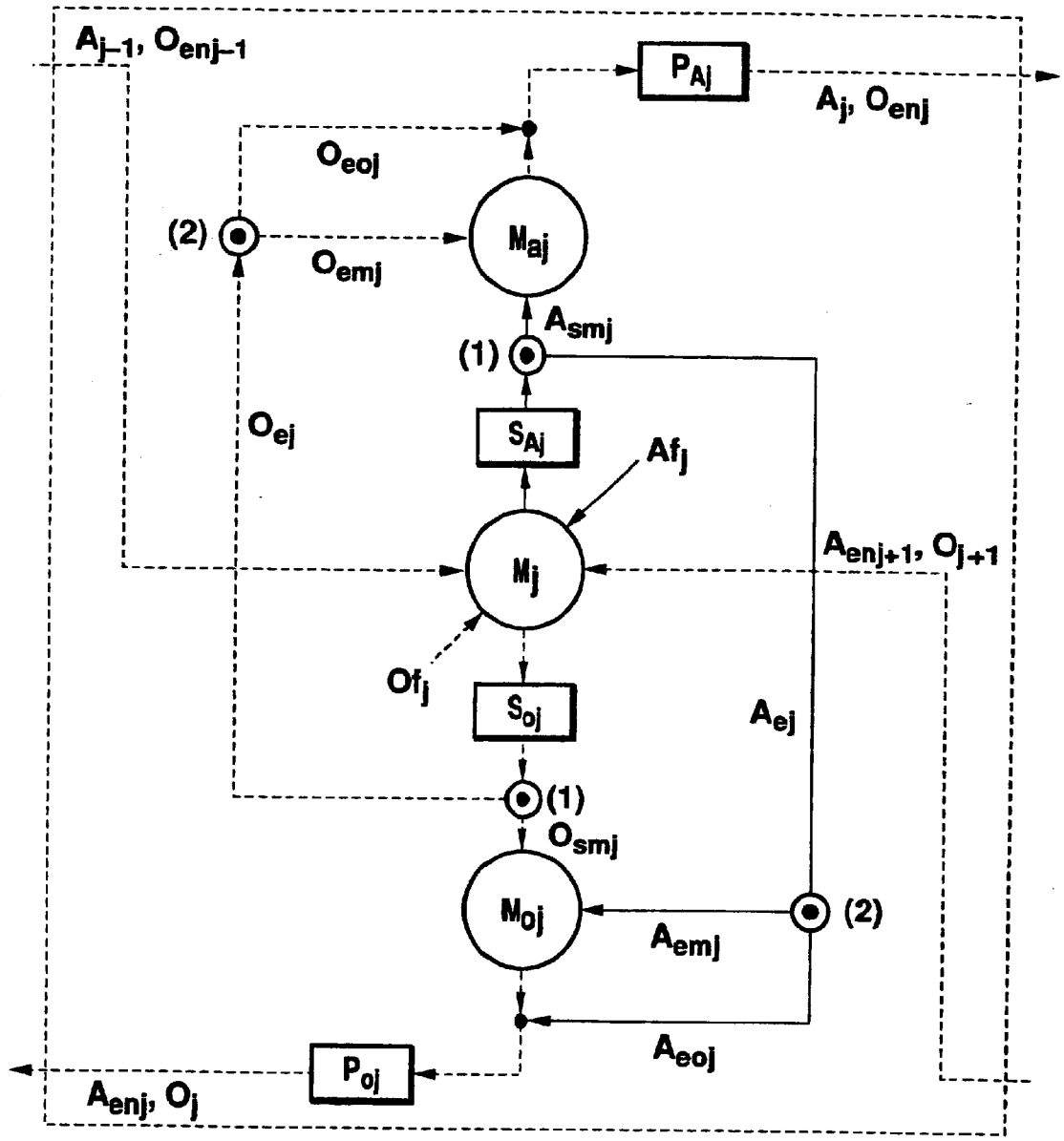
FIG. 11 is a diagram illustrating a model of the entrainment type.
Figure 12:
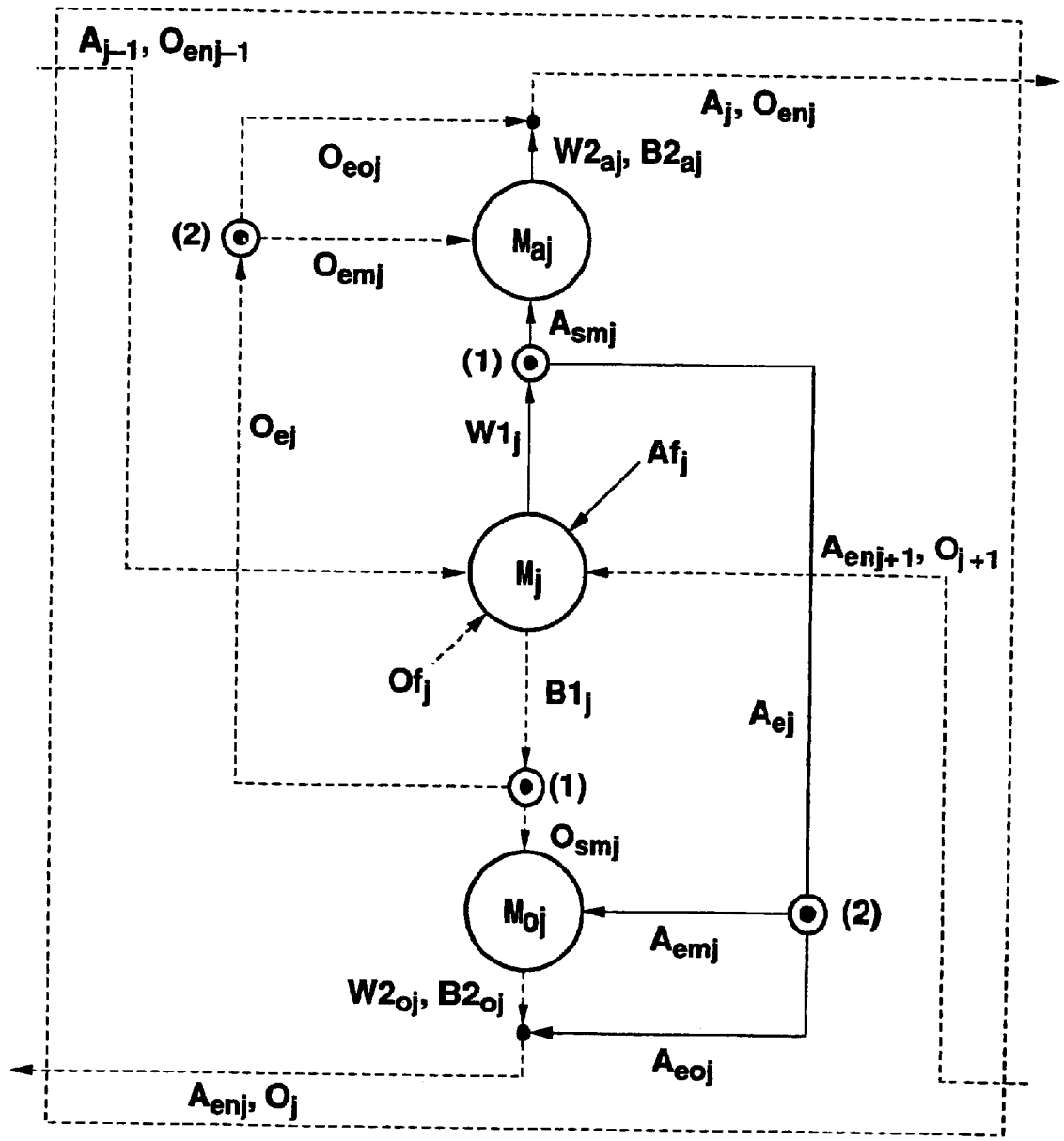
FIG. 12 is a diagram illustrating a model of the entrainment type (for calculating steady state).

Models as illustrated in FIGS. 11 or 12 can be composed by expressing the above phenomena as connections between element models. (The model in FIG. 12 is for calculating the steady state.) In the present model too, the following events can be expressed by changing the divided-flow ratio of each flow divider.

Entrainment is generated in the flow divider (1) shown in the figure. When entrainment occurs, organic phase/water phase flows flow through the same piping. In this case a portion of both phases will be involved in an extraction reaction via a contact surface or due to partial mixing. To simulate the phenomenon, extraction equilibrium calculation is performed by contacting a portion of a phase with another phase in the flow divider (2) shown in the figure. The extraction equilibrium calculation uses [PULSSTG] and [EXTRACT] composing the mixing section. Here, by changing settings of the flow divider (2), the proportion to be involved in extraction reaction can be defined.

By connecting models, each of which corresponds to a single extractor, and appropriately setting a divided-flow ratio of each flow divider, a multistage model can be defined for generating an entrainment at an arbitrary stage/phase.

3.3.3 Mathematical Model

The basic mathematical model of the present model will be described below.
The variables will be described first.(for the location of flow rate, see FIG. 12).

i: component symbol, j: stage symbol, Vaj: water phase volume of mixing section[M], Aj: water phase flow rate (normal line), Oj: organic phase flow rate normal line, Afj: water phase supply flow rate, xfi,j: water phase concentration of Afj flow, Di,j: distribution coefficient, O: organic phase supply flow rate, yfi,j: organic phase concentration of Ofj flow, W1j: water phase flow rate from mixing section [M] to flow divider (1), xw1i,j: water phase concentration in [M], B1j: organic phase flow rate from mixing section [M] to flow divider (1), yb1i,j: organic phase concentration in [M], Aej: water phase flow rate from flow divider (1) to flow divider (2), Asmj: water phase flow rate from flow divider (1) to mixing section [Ma], SD1aj: divided-flow ratio from flow divider (1) to flow divider (2) (water phase), Oej: organic phase flow rate from flow divider (1) to flow divider (2), Osmj: organic phase flow rate from flow divider (1) to mixing section [Ma], SD1oj: divided-flow ratio from flow divider (1) to flow divider (2) (organic phase), Aemj: water phase flow rate from flow divider (2) to mixing section [Mo], Aeoj: water phase flow rate from flow divider (2) to flow merger ●, SD2aj: divided-flow ratio from flow divider (2) to mixing section [Mo] (water phase), Oemj: organic phase flow rate from flow divider (2) to mixing section [Ma], Oeoj: organic phase flow rate from flow divider (2) to flow merger ●, SD2oj: divided-flow ratio from flow divider (2) to mixing section [Ma] (organic phase), Vmaaj: water phase volume in [Ma], Vmaoj: organic phase volume in [Ma], W2aj: water phase flow rate from [Ma] to flow merger ●, xw2ai,j: water phase concentration in [Ma], B2aj: organic phase flow rate from [Ma] to flow merger ●, yb2ai,j: organic phase concentration in [Ma], Vmoaj: water phase volume in [Mo], Vmooj: organic phase volume in [Mo], W2oj: water phase flow rate from [Mo] to flow merger ●, xw2oi,j: water phase concentration in [Mo], B2oj: organic phase flow rate from [Mo] to flow merger ●, yb2oi,j: organic phase concentration in [Mo], xi,j: water phase concentration at extractor outlet (normal line), yi,j: organic phase concentration at extractor outlet (normal line).

The i-th component at the j-th stage will be given as follows:

nearby the mixing section [M]

$$Vaj \cdot dxw1i,j/dt + Voj \cdot dyb1i,j/dt = Aj-1 \cdot xi,j-1 + Oj+1 \cdot yi,j+1 + Aenj+1 \cdot xeni,j+1 + Oenj-1 \cdot yeni,j-1 + Afj \cdot xfi,j + Ojf \cdot yfi,j - W1j \cdot xw1i,j - B1j \cdot yb1i,j \quad (3.3\text{-}1)$$

(mass balance in mixing section between dt)

(Because yi,j=Di,j·xi,j and Di,j=fi(xi,j), being the same extraction system, they are the same functional form as (3.1-2) and (3.1-3).)

nearby the flow divider (1): water phase $$W1j \cdot xw1i,j = (Aej + Asmj) \cdot xw1i,j \quad (3.3\text{-}2)$$

$$Aej = SD1aj \cdot W1j \quad (3.3\text{-}3)$$

$$B1j \cdot yb1i,j = (Oej + Osmj) \cdot yb1i,j \quad (3.3\text{-}4)$$

$$Oej = SD1oj \cdot B1j \quad (3.3\text{-}5)$$

nearby the flow divider (2): water phase $$Aej \cdot xw1i,j = (Aemj + Aeoj) \cdot xw1i,j \quad (3.3\text{-}6)$$

$$Aemj = SD2aj \cdot Aej \quad (3.3\text{-}7)$$

nearby the flow divider (2): organic phase $$Oej \cdot yb1i,j = (Oemj + Oeoj) \cdot yb1i,j \quad (3.3\text{-}8)$$

$$Oemj \; SD2oj \cdot Oej \quad (3.3\text{-}9)$$

nearby the mixing section [Ma]

$$Vmaaj \cdot dxw2ai,j/dt + Vmaoj \cdot dyb2ai,j/dt = Asmj \cdot xw1i,j + Oemj + yb1i,j - W2aj \cdot xw2ai,j - B2aj \cdot yb2ai,j \quad (3.3\text{-}10)$$

(Because yi,j=Di,j·xi,j and Di,j=fi(xi,j), being the same extraction system, they are the same functional form as (3.1-2) and (3.1-3).)

nearby the mixing section [Mo]

$$Vmoaj \cdot dxw2oi,j/dt + Vmooj \cdot dyb2oi,j/dt = Osmj \cdot yb1i,j + Aemj + 1 \cdot xw1i,j - W2oj \cdot xw2oi,j - B2oj \cdot yb2oi,j \quad (3.3\text{-}11)$$

(Because yi,j=Di,j·xi,j and Di,j=fi(xi,j), being the same extraction system, they are the same functional form as (3.1-2) and (3.1-3).)

nearby the flow merger ●: water phase (merged from the flow divider (2) and the mixing section [Ma])

$$W2aj = Aj \; xw2ai,j = xi,j \quad (3.3\text{-}12)$$

$$B2aj \cdot yb2ai,j + Oeoj \cdot yb1i,j = Oenj \cdot yeni,j \quad (3.3\text{-}13)$$

nearby the flow merger ●: organic phase (merged from the flow divider (2) and the mixing section [Mo])

$$B2oj = Oj \; yb2oi,j = yi,j \quad (3.3\text{-}14)$$

$$W2oj \cdot xw2oi,j + Aeoj \cdot xeoi,j = Aenj \cdot xeni,j \quad (3.3\text{-}15)$$

According to foregoing expressions, concentration of each component i of each flow described above can be obtained for all stages from boundary conditions (operation conditions) where if divided-flow ratio is given as a constant or a function of variables appearing in the above-mentioned expressions.

3.3.4 Composition Element Models

The same elements as those for normal flow models can be used for mass balance/extraction equilibrium calculation, settlers, and piping in a mixing phenomenon of mixing section and entrainment flow. Flow divider plays the role as follows:

(1) Flow Divider

Described in FIG. 12

Flow divider (1): Generates entrainments. The divided-flow ratio, given by the user, defines the rate of the entrainment to be generated.

Flow divider (2): Defines the proportion which will be involved in extraction reaction with another phase.

Definition of the divided-flow ratio is as follows:

$$F1 = Fin \cdot D, \; F2 = Fin - F1 \quad (3.3\text{-}16)$$

where,

F1: flow rate toward defined direction, Fin: flow rate supplied to flow divider, F2: flow rate outward of defined range, D: divided-flow ratio(–) ($0.0 \leq D \leq 1.0$)

3.3.5. Apparatus/Process Model

The calculation method and the concept regarding addition of a flow divider/merger are similar to that of the overflow model.

3.4. Reflux Model 3.4.1. Reflux Phenomenon

Figure 13:
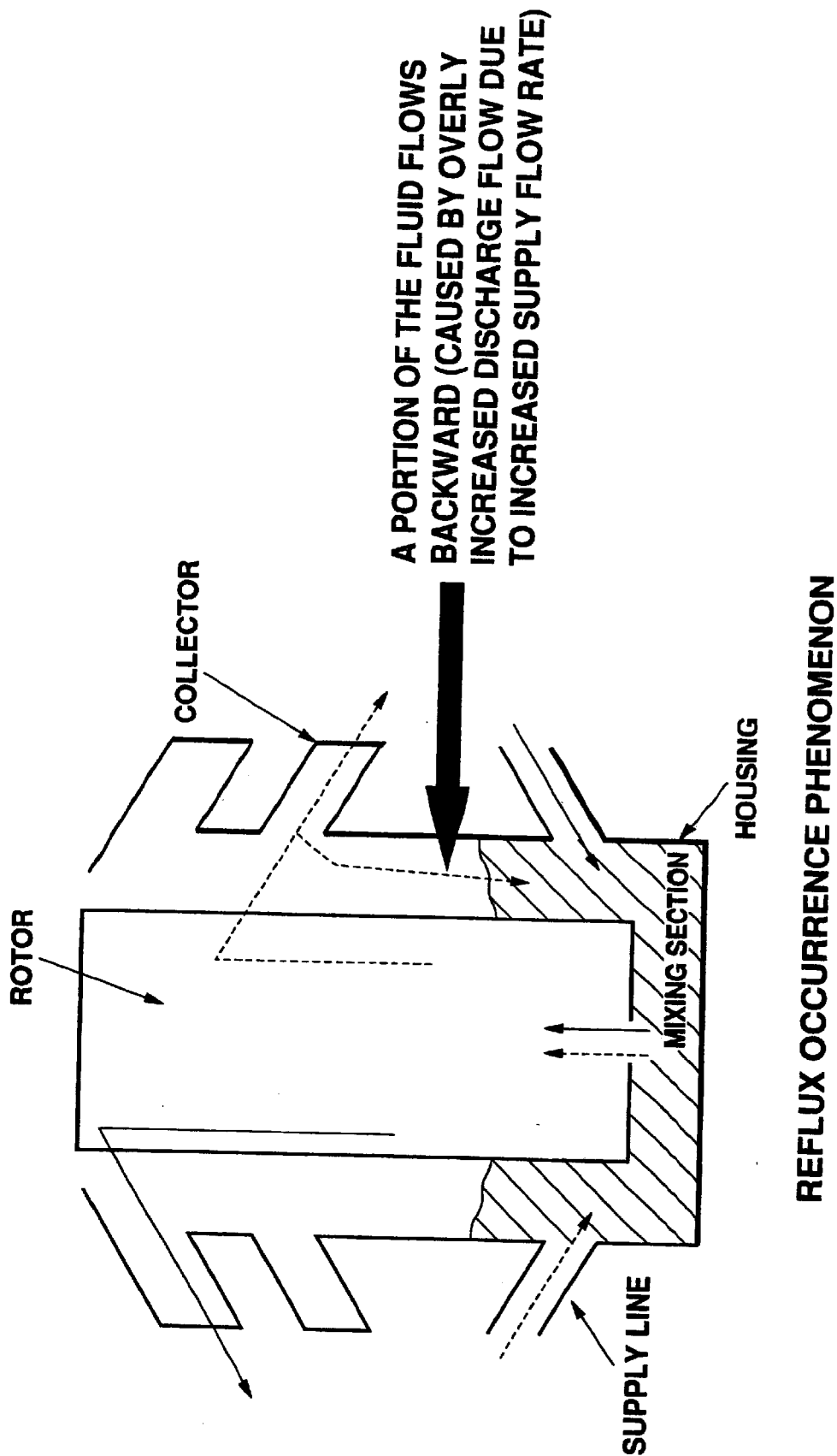
FIG. 13 is a diagram illustrating a reflux phenomenon.

FIG. 13 illustrates schematic diagram of a cross section of a centrifugal extractor. The phenomenon is such that a portion of flow flows back to the mixing section from the collector section, whereas water phase and organic phase flows flow out from respective outlets toward the next stage in a normal operation condition.

When reflux occurs, the concentration profile at each stage differs from that in the case with a normal operation condition. Although there had not been a method for evaluating concentration profiles in such cases, the present model provides an evaluation.

3.4.2. Model

Figure 14:
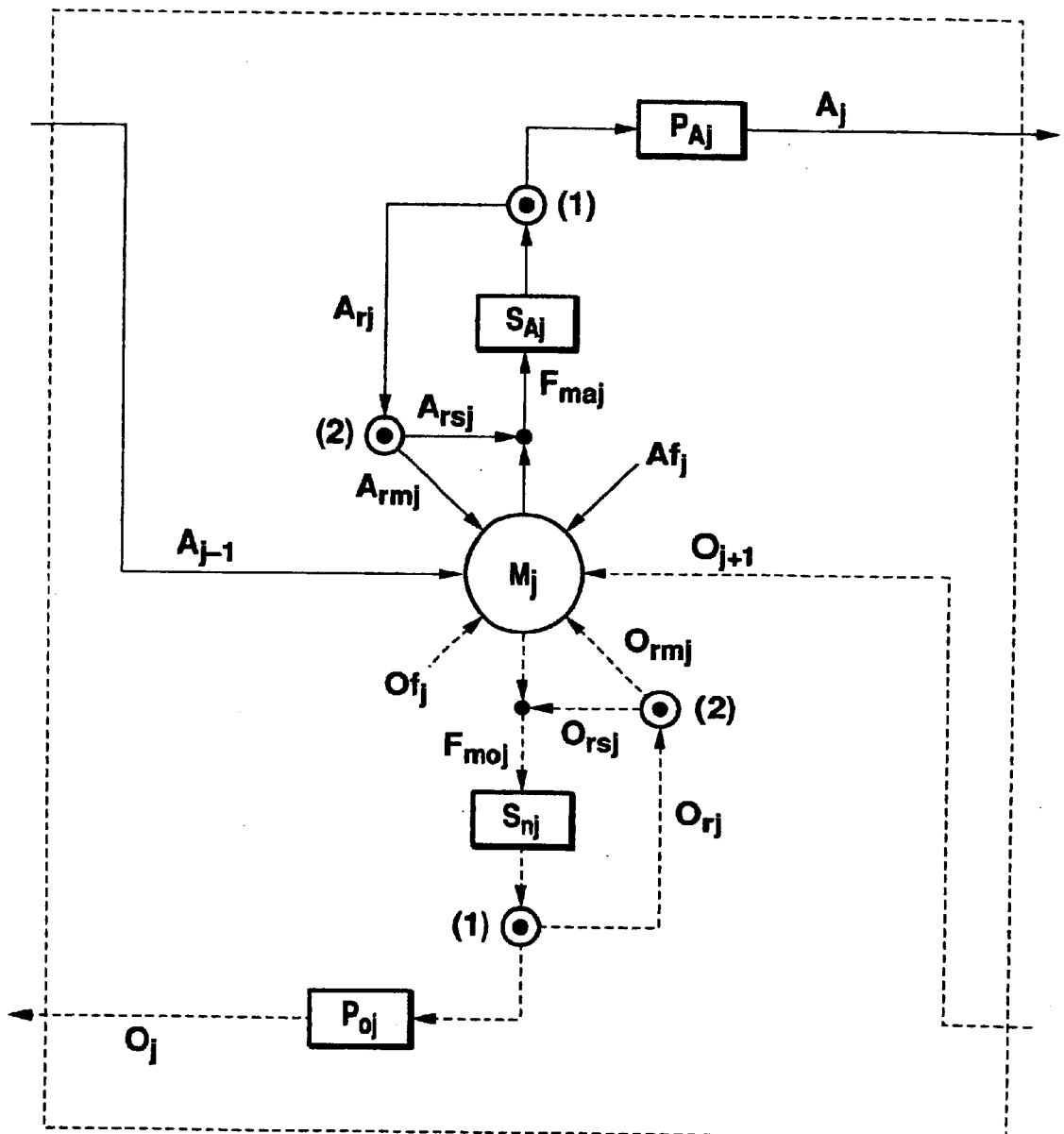
FIG. 14 is a diagram illustrating a model of the reflux type.
Figure 15:
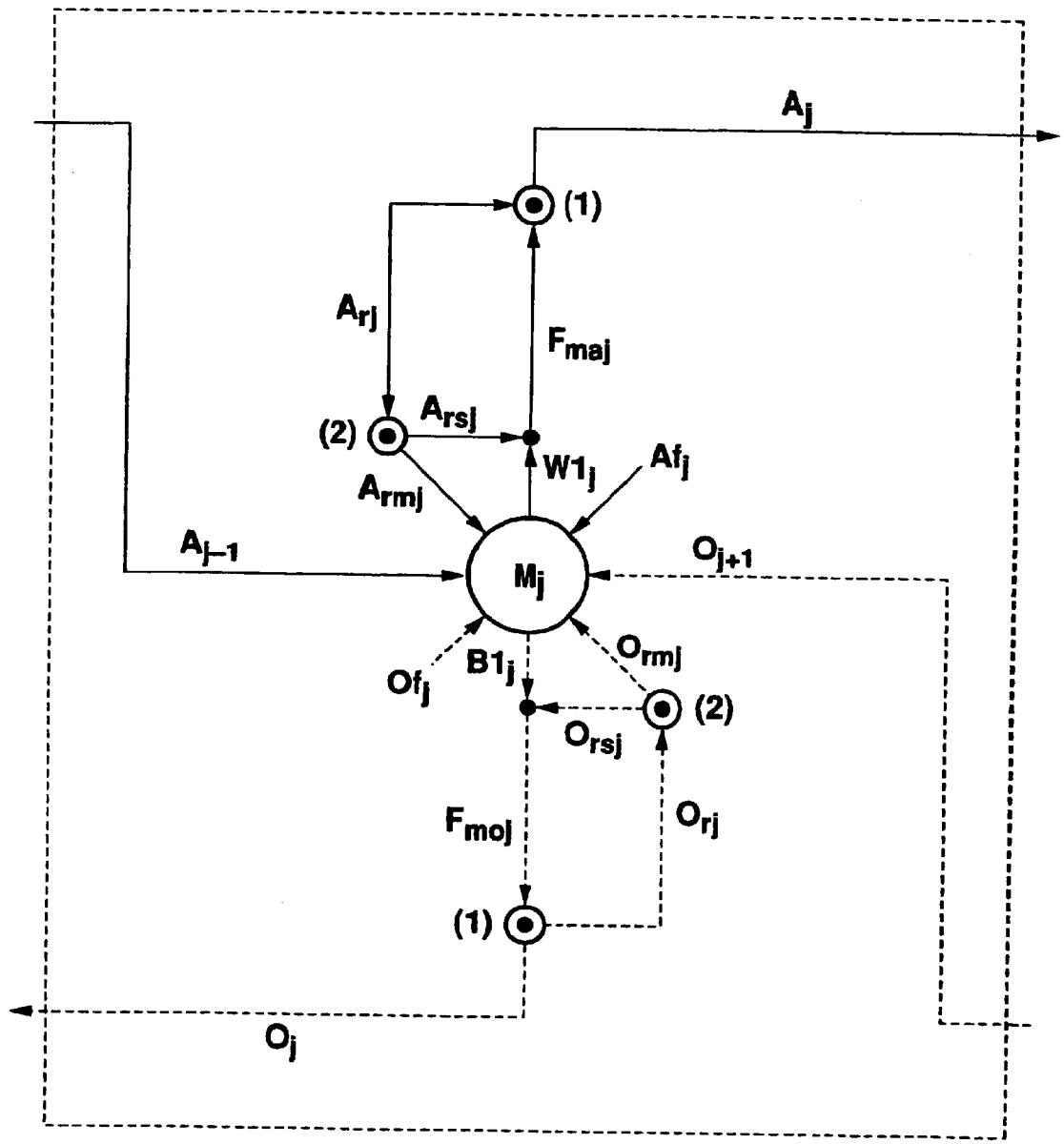
FIG. 15 is a diagram illustrating a model of the reflux type (for calculating steady state).

Models as illustrated in FIGS. 14 or 15 can be composed by expressing the above phenomena as connections between element models. (The model in FIG. 15 is for calculating the steady state.) In the present model too, the following events can be expressed by changing the divided-flow ratio of each flow divider.

Reflux is generated in the flow divider (1). The proportion of the reflux flow which will be involved in extraction reaction in the mixing section is defined in the flow divider (2).

By connecting models, each of which corresponds to a single extractor, and appropriately setting divided-flow ratio of each flow divider, a multistage model can be defined for generating a reflux at an arbitrary stage/phase.

3.4.3 Mathematical Model

With a similar concept to that in the overflow or entrainment model, the i-th component in the j-th stage will be given as follows: (for the location of flow rate, see FIG. 15).

i: component symbol, j: stage symbol, Vaj: water phase volume in mixing section [M], Voj: organic phase volume in mixing section [M], xi,j: water phase concentration at extractor outlet, yi,j: organic phase concentration at extractor outlet, Aj: water phase flow rate (normal line), Oj: organic phase flow rate normal line, Afj: water phase supply flow rate, xfi,j: water phase concentration of Afj flow, Ofj: organic phase supply flow rate, yfi,j: organic phase concentration of Ofj flow, Di,j: distribution coefficient, Armj: water phase flow rate from flow divider (2) to mixing section [M], xrmi,j: water phase concentration of Armj flow, Ormj: organic phase flow rate from flow divider (2) to mixing section [M], yrmi,j: organic phase concentration of Ormj flow, W1j: water phase flow rate from mixing section [M] to flow divider (1), xw1i,j: water phase concentration in [M], B1j: organic phase flow rate from mixing section [M] to flow divider (1), yb1i,j: organic phase concentration in [M], Arsj: water phase flow rate from flow divider (2) to flow merger ●, xrsi,j: water phase concentration of Arsj flow, Fmaj: water phase flow rate from flow merger ● to flow divider (1), Orsj: organic phase flow rate from flow divider (2) to flow merger ●, yrsi,j: organic phase concentration of Orsj flow, Fmoj: organic phase flow rate from flow merger ● to flow divider (1), Arj: water phase flow rate from flow divider (1) to flow divider (2), SD1aj: divided-flow ratio from flow divider (1) to flow divider (2) (water phase), Orj: organic phase flow rate from flow divider (1) to flow divider (2), SD1oj: divided-flow ratio from flow divider (1) to flow divider(2) (organic phase), SD2aj: divided-flow ratio from flow divider (2) to flow merger ● (water phase), SD2oj: divided-flow ratio from flow divider (2) to flow merger ● (organic phase), nearby the mixing section [M]

$$Vaj \cdot dxw1i,j/dt + Vbj \cdot dyb1i,j/dt = Aj{-}1 \cdot xi,j{-}1 + Oj{+}1 \cdot yi,j{+}1 + Armj{+}1 \cdot xrmi,j{+}1 + Ormj{-}1 \cdot yrmi,j{-}1 + Afj \cdot xfi,j + Ofj \cdot yfi.j - W1j \cdot xw1i,j - B1j \cdot yb1i,j \quad (3.4\text{-}1)$$

($yi,j = Di,j \cdot xi,j$ and $Di,j = fi(xi,j)$, being the same extraction system, are the same functional form as (3.1-2) and (3.1-3).)

nearby the flow merger ●: water phase (merged from flow divider (2) and mixing section [M]

$$W1j \cdot xw1i,j + Arsj \cdot xrsi,j = Fmaj \cdot xi,j \quad (3.4\text{-}2)$$

nearby the flow merger ●: organic phase (merged from flow divider (2) and mixing section [M]

$$B1j \cdot yb1i,j + Orsj \cdot xrsi,j = Fmaj \cdot xi,j \quad (3.4\text{-}2)$$

nearby the flow divider (1): water phase $$Fmaj \cdot xi,j = (Arj + Aj) \cdot xi,j \quad (3.4\text{-}4)$$

$$Arj = SD1aj \cdot Fmaj \quad (3.4\text{-}5)$$

nearby the flow divider (1): organic phase $$Fmoj \cdot yi,j = (Orj + Oj) \cdot yi,j \quad (3.4\text{-}6)$$

$$Orj = SD1oj \cdot Fmoj \quad (3.4\text{-}7)$$

nearby the flow divider (2): water phase $$Arj \cdot xi,j = (Arsj + Armj) \cdot xi,j \quad (3.4\text{-}8)$$

$$Arsj = SD2aj \cdot Arj \quad (3.3\text{-}9)$$

nearby the flow divider (2): organic phase $$Orj \cdot yi,j = (Orsj + Ormj) \cdot yi,j \quad (3.3\text{-}10)$$

$$Orsj = SD2oj \cdot Orj \quad (3.3\text{-}11)$$

where, $$xi,j = xrmi,j, \ yi,j = yrmi,j, \ xi,j = xrsi,j, \ yi,j = yrsi,j \quad (3.4\text{-}12)$$

According to the foregoing expressions, concentration of each component i of each flow described above can be obtained for all stages from boundary conditions (operation conditions) where if divided-flow ratio is given as a constant or a function of variables appearing in the above-mentioned expressions.

3.4.4 Composition Element Models

The same elements as those for normal flow models can be used for mass balance/extraction equilibrium calculation, settlers, and piping. Flow divider plays the role as follows:

(1) Flow Divider

Flow divider (1): Generates reflux. The given divided-flow ratio defines the rate of the reflux to be generated.

Flow divider (2): Sets the divided-flow ratio and defines the flow rate which will be involved in extraction in the mixing section.

3.4.5. Apparatus/Process Model

The calculation method and the concept regarding addition of a flow divider/merger are similar to that of the foregoing models.

4. EXAMPLE OF ANALYSIS

Concentration profile (in a steady state) when an overflow has occurred is analyzed.

4.1. Process to be Analyzed

Figure 16:
FIG. 16 is a diagram illustrating the condition of an analytical object.
Figure 16:
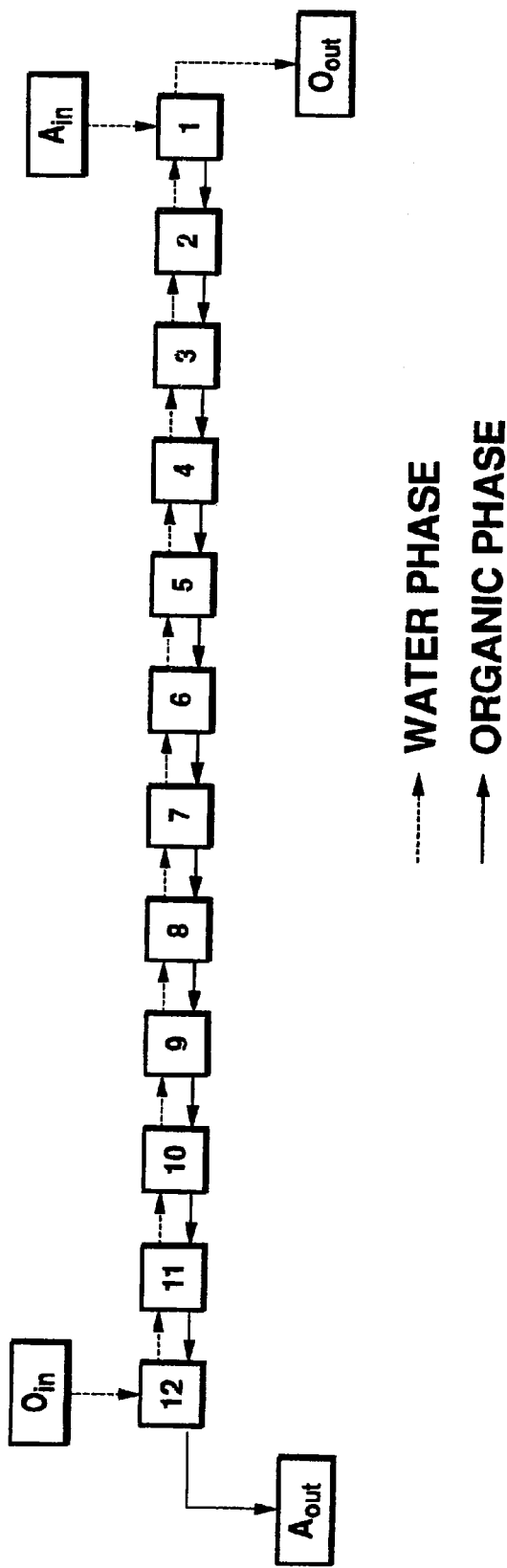
Figure 17:
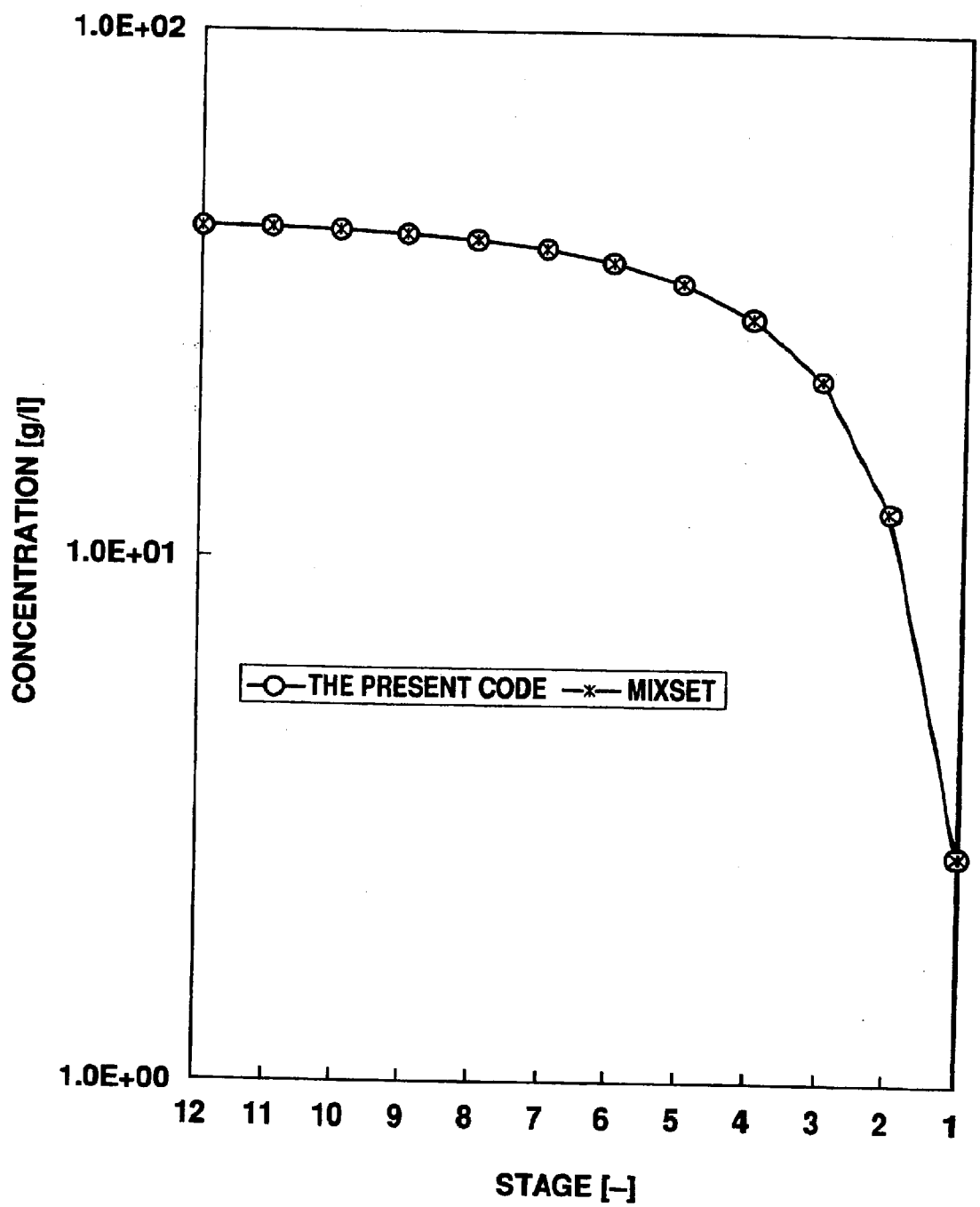
FIG. 17 is a diagram illustrating U concentration in organic phase (in normal flow state).
Figure 18:
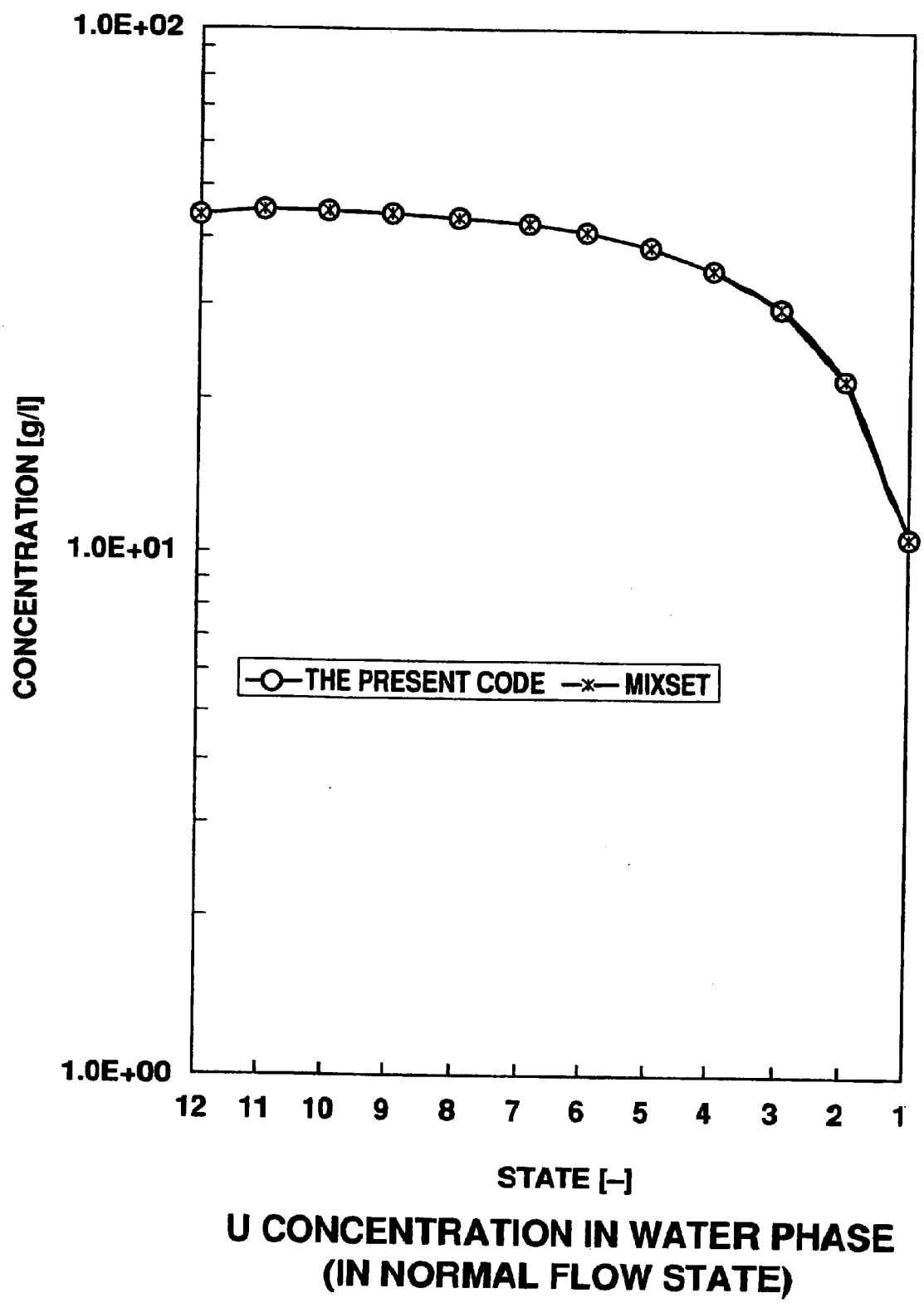
FIG. 18 is a diagram illustrating U concentration in water phase (in normal flow state).
Figure 19:
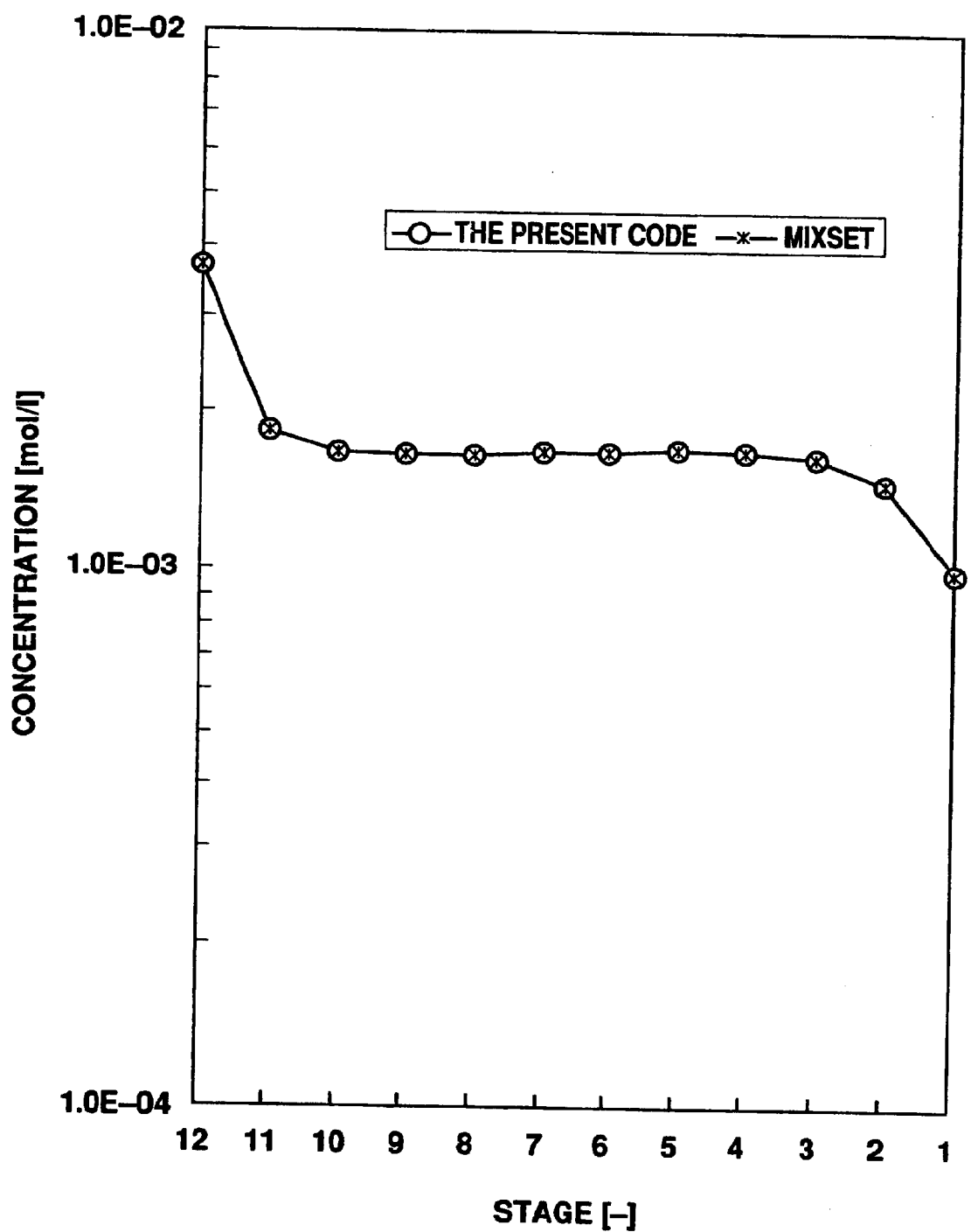
FIG. 19 is a diagram illustrating $HNO_3$ concentration in organic phase (in normal flow state).
Figure 20:
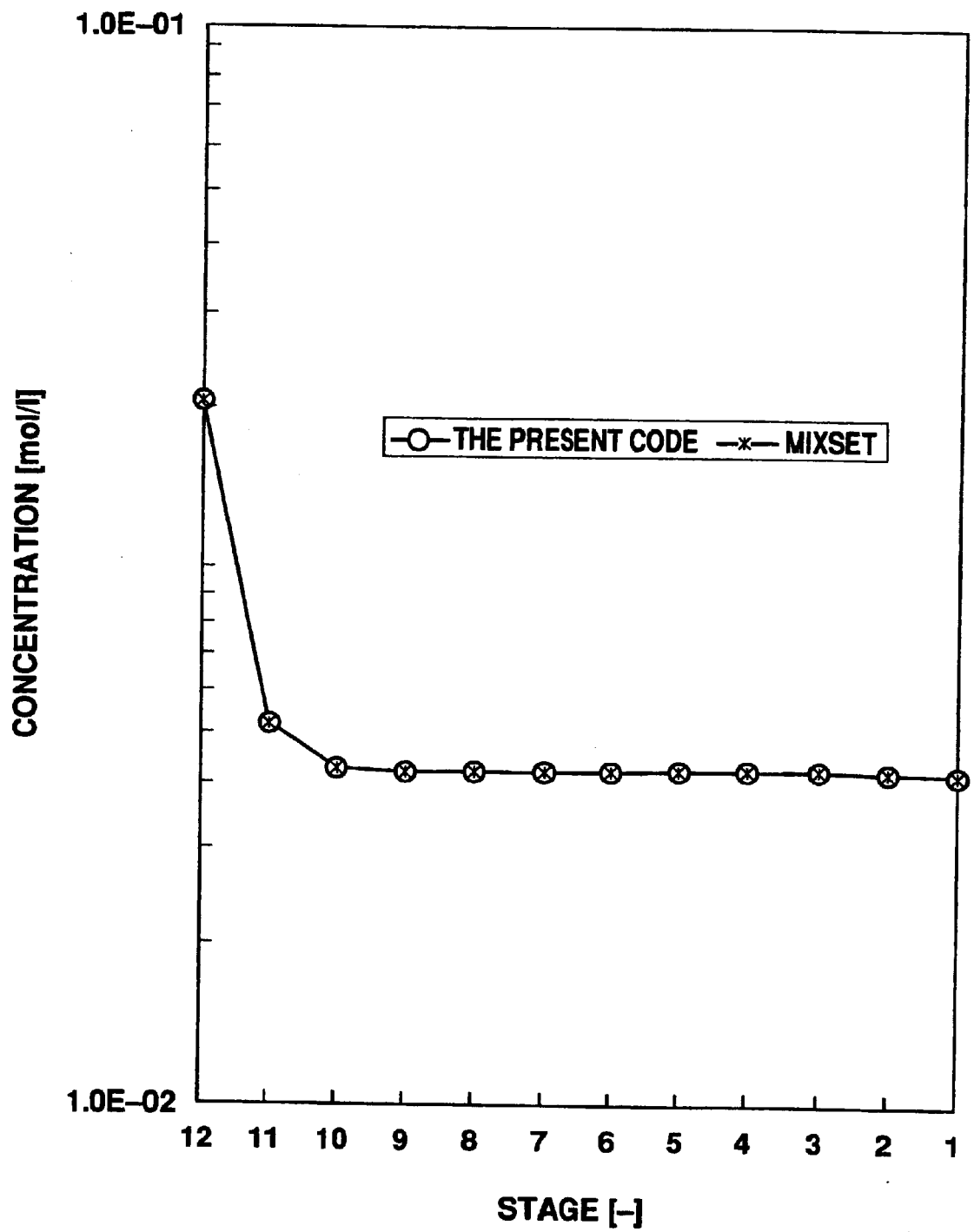
FIG. 20 is a diagram illustrating $HNO_3$ concentration in water phase (in normal flow state).

FIG. 16 illustrates the process and its operation conditions to be analyzed. Conditions for organic phase in-flow Oin are, flow rate: 182.943[l/hr], $HNO_3$ concentration: 2.5168×10−2[mol/l], U concentration: 42.191[g/l], TBP concentration: 30[vol %] for all TBP. Conditions for water phase in-flow Ain are, flow rate: 164.000[l/hr], $HNO_3$ concentration: 2.0× 10−2[mol/l]. Here the extraction process has twelve stages.

4.2. Model

For the above-stated analysis, a model, composed as a combination of twelve stages of overflow type extraction apparatus models, will be used.

4.3. The Case of Normal Flow State

As a standard of comparison, concentration profile is first obtained under a state without occurrence of an overflow. This calculation is possible in the present model too, by giving the appropriate divided-flow ratio for each flow divider.

(1) Setting Divided-flow Ratio

Settings for a normal flow are as follows (see FIG. 9).

Flow divider (1): Divided-flow ratio toward the overflow (W2j and B2j) is D=0.0 (no overflow occurs)

Flow dividers (2) and (4): Because no overflow occurs, divided-flow ratio D can be any value, having no effect on the system (no settings required).

The foregoing settings realize a twelve-stage extraction process of a normal flow.

(2) Setting Supply Conditions From Outside

Supply rates of organic phase and water phase are set. Because the unit of the above settings in the present model is [mol/h], each component of the conditions in FIG. 16 is converted into [mol/h] before being set.

(3) Results

FIGS. 17 to 20 illustrate concentration profiles of each stage, respectively. The figures also show calculation results of MIXSET under the same conditions.

It can be seen that calculation results of the present code match very well with those of MIXSET, for both U concentration and $HNO_3$ concentration. Table 2 lists mass balance of the entire bank (process)/each stage. Mass balance is satisfied for the entire process and each stage (i.e., inflow-outflow ≈0.0. Being a convergence solution, it never becomes exactly 0.0), and the convergence accuracy is much the same for both codes (For $HNO_3$, however, the present code converges accurately.).

TABLE 3

| CASE | OVERFLOW RATE OCCURRED(g/l) (from each stage) | DIRECTION OF OVERFLOW | COMPONENT OF OVERFLOW |
|---|---|---|---|
| A | 16.0 | ALL DIRECTED TO WATER PHASE | SAME AS O/A OF SUPPLY |
| B | " | BOTH DIRECTIONS (½ EACH) | SAME AS O/A OF SUPPLY |
| C | " | ALL DIRECTED TO ORGANIC PHASE | SAME AS O/A OF SUPPLY |

(O/A: Organic phase flow rate/Water phase flow rate)

Supply rate from outside is the same as that of a normal flow situation.

Therefore, an overflow phenomenon can be simulated by changing divided-flow ratio settings for the model under a normal flow situation.

(1) Setting Divided-flow Ratio

Divided flow ratio of the flow divider (FIG. 9, the flow-divider (1)) which generates an overflow is set so that 8.4 g/l organic phase and 7.6 g/l water phase (same ratio as O/A) will flow toward B2j and W2j, respectively. Flow divider (FIG. 9, the flow-divider (2)) which distributes overflow is set so that case A flows toward the right side in FIG. 9, case C flows toward the left side in FIG. 9, and case

TABLE 2

MASS BALANCE OF THE ENTIRE BANK (PROCESS) AND EACH STAGE

MASS BALANCE OF THE ENTIRE BANK

| | URANIUM(mol/h) | | | HNO3(mol/h) | | |
|---|---|---|---|---|---|---|
| | INFLOW | OUTFLOW | INFLOW-OUTFLOW | INFLOW | OUTFLOW | INFLOW-OUTFLOW |
| THE PRESENT CODE | 3.243334E+1 | 3.236019E+01 | 7.341661E-02 | 7.884309E+00 | 7.884310E+00 | -5.128080E-07 |
| MIXSET | 3.243334E+1 | 3.235367E+01 | 7.966976E-02 | 7.884309E+00 | 7.884360E+00 | -5.020877E-05 |

MASS BALANCE OF EACH STAGE

| | URANIUM:INFLOW-OUTFLOW(mol/h) | | HNO3:INPUT-OUTPUT(mol/h) | |
|---|---|---|---|---|
| STAGE | THE PRESENT CODE | MIXSET | THE PRESENT CODE | MIXSET |
| 12 | -2.128781D-04 | -3842507E-04 | -1.258336D-06 | -3.716240E-05 |
| 11 | 4.447997D-04 | 4.993573E-04 | 2.987379D-06 | -4.821130E-05 |
| 10 | -6.477440D-04 | 2.049063E-04 | -2.964013D-06 | -3.490870E-05 |
| 9 | 8.028446D-04 | -3.326934E-04 | 1.563916D-06 | 4.631910E-05 |
| 8 | -9.238853D-04 | 6.416034E-05 | -1.007116D-06 | -3.788600E-5 |
| 7 | 9.835145D-04 | -3.491694E-04 | 7.736121D-07 | 8.822800E-05 |
| 6 | -9.748163D-04 | 5.808299E-04 | -9.186840D-07 | -5.747770E-5 |
| 5 | 8.686178D-04 | -4.486601E-04 | 1.185958D-06 | -3.723730E-05 |
| 4 | -6.450671D-04 | 4.757462E-04 | -1.235322D-06 | 1.162528E-04 |
| 3 | 3857095D-04 | -1.966116E-05 | 9.145168D-07 | -7.603340E-05 |
| 2 | -1.480245D-04 | -3.461271E-04 | -5.879312D-07 | 6.447790E-05 |
| 1 | 1.333226D-05 | -5.385283E-05 | 1.115546D-07 | -3.659377E-05 |

As described above, it can be said that the extraction equilibrium calculation logic in the present code is correctly installed and can be applied to evaluation of an extraction process composed by a combination of flow mergers and flow dividers.

4.4. At Occurrence of Overflows

Occurrence of overflows having the same rate throughout the stages is simulated, with cases of calculation listed below. It is assumed that all of the overflows will reach extraction equilibrium in the mixing section.

B flows toward both sides evenly. The flow divider (4) (FIG. 9) is set so that all of the flows flow toward the mixing section [M].

(2) Results and Studies

Figure 21:
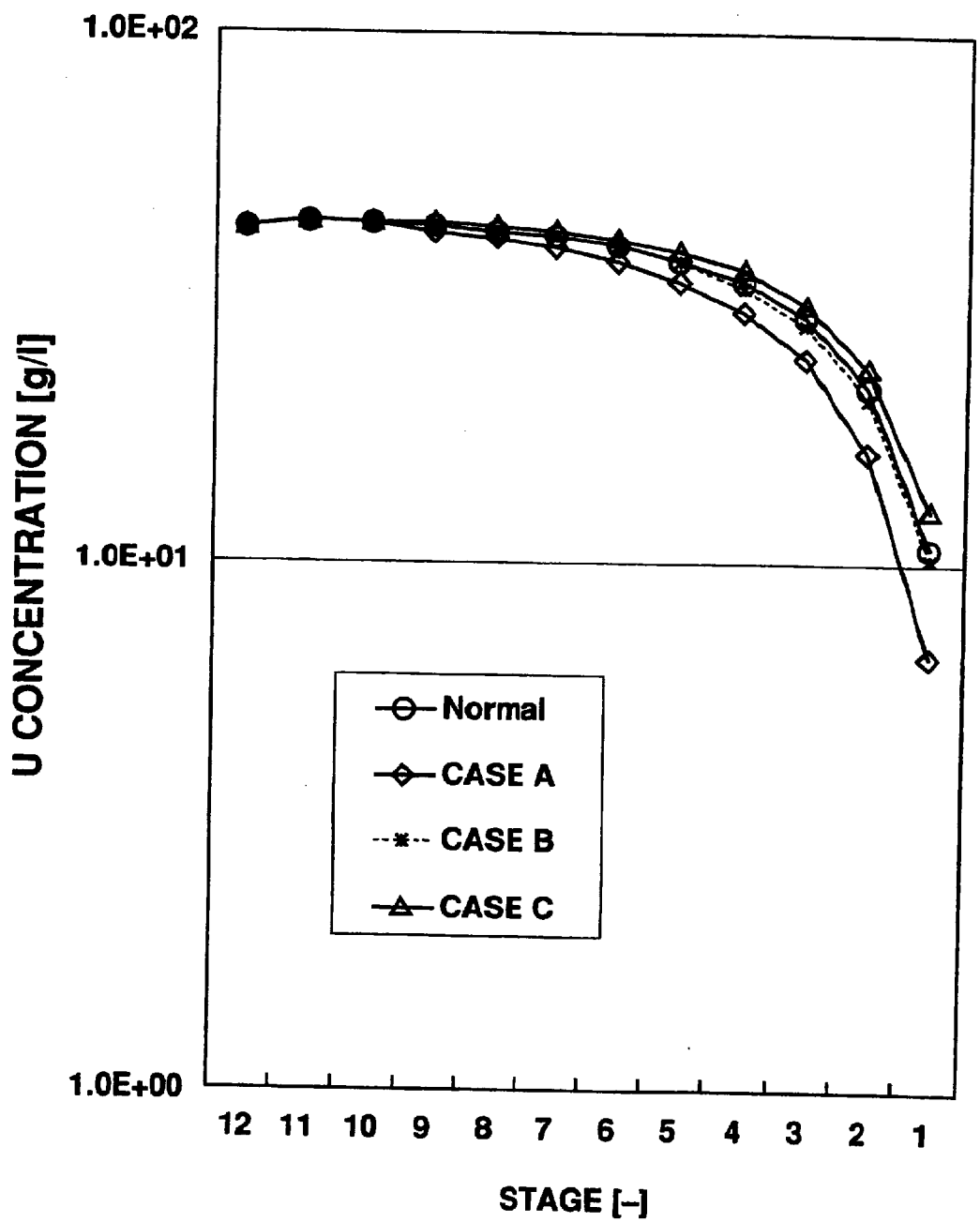
FIG. 21 is a diagram illustrating the change of concentration due to overflow (U concentration in water phase).
Figure 22:
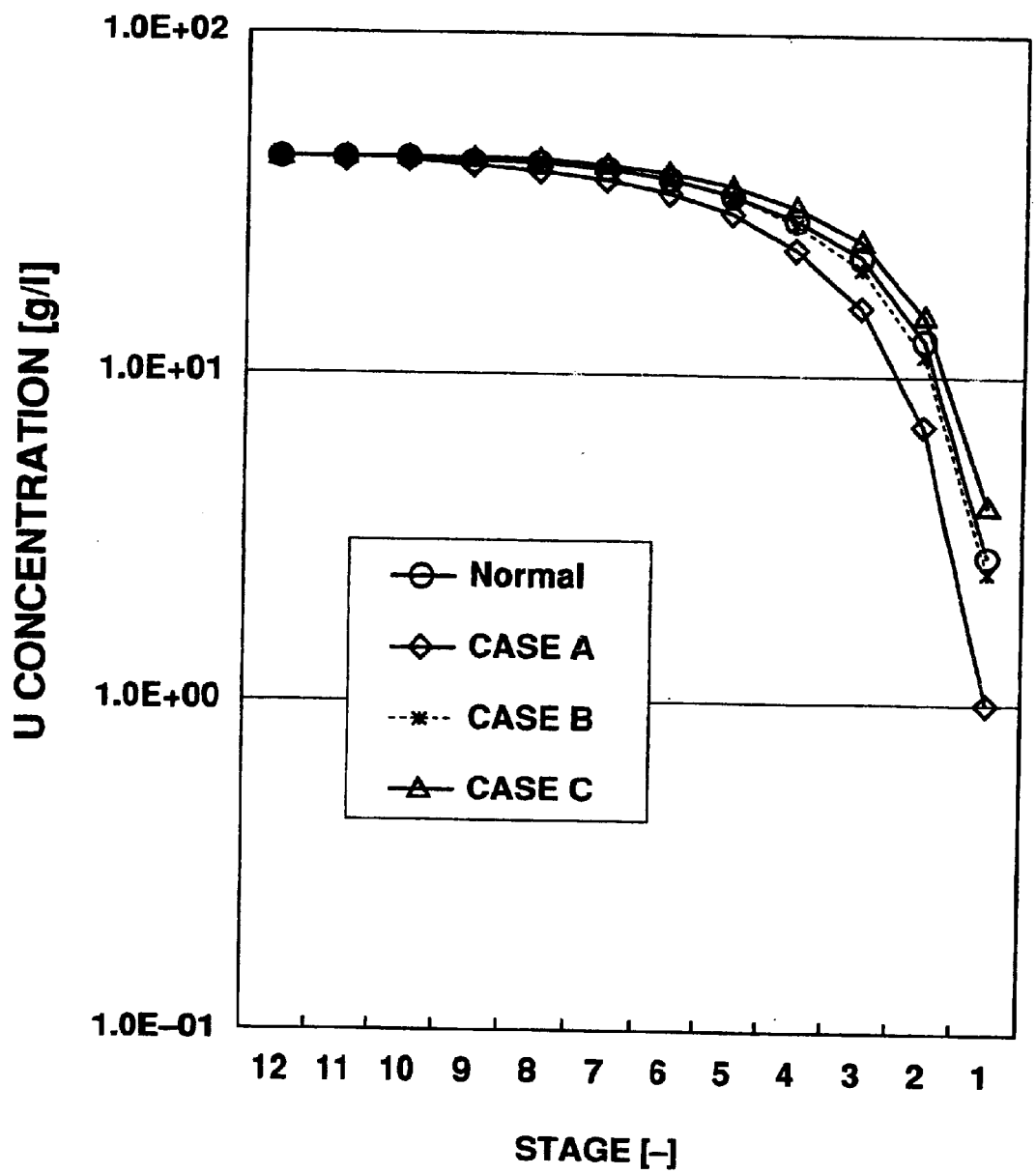
FIG. 22 is a diagram illustrating the change of concentration due to overflow (U concentration in organic phase).

FIGS. 21 and 22 illustrate changes of uranium (U) concentration at each stage, comparing them with those in a normal flow situation (referred to as Normal in the Figs.).

The results suggest the following.

U concentration, in comparison with that in a normal flow situation, rises if the overflow flows toward the organic phase side (case C) and falls if the overflow flows toward the water phase side (case A).

Concentration profile shows little change if overflows occur at both sides (case B).

A qualitative explanation of the foregoing phenomenon is given as follows, the trend of which is thought to be valid.

In case C, both the overflow and the normal flow are flowing, in organic phase, toward the original direction, which is the same as the case where the sum of the two flows along a normal flow passage. In water phase, on the other hand, a portion of the flow which is supposed to flow toward the left side in FIGS. 21 and 22 flows backward. Because water phase U concentration is higher in the left side, water phase with a higher U concentration than the normal flow tends to be supplied to later stages, which increases U concentration.

The situation being opposite in case A, both the normal flow and the overflow in water phase side flow toward the normal direction, while a portion of organic phase flows back toward the opposite direction of the normal flow.

In case B, there is little change of concentration because effects of both flows tend to cancel each other.

The numerical solution, being a combined event of mass transfer and extraction reaction, has thus been justified because extraction equilibrium logic is normally installed in the element model, and, as stated above, mass balance calculations are performed for both the entire process and the vicinity of flow dividers or mergers.

According to the present invention, as described in the foregoing, change of models or analysis expressions can be handled easily because element models are composed by dividing the behavior inside the extractor into appropriate units, provided that object-oriented software is be used.

Besides, a variety of abnormal flows other than normal flows can be simulated easily because a portion of a flow can be divided in a flow divider, and more than one flow can be merged in a flow merger.

What is claimed is:

1. A simulation method of an extraction system which stimulates the operation of an extraction system, said simulation method comprising the steps of:

utilizing object-oriented software for dividing the operation of the extraction system into individual basic elements of appropriate units for individual calculation so that the behavior of each individual basic element can be analyzed separately;

simulating extractors that mix fluids of two phases and extract substance included in one fluid into the other fluid; and providing, as basic elements which compose the extractor, a mixing section for simulating separation and mixing of fluids of two phases and mass transfer between the fluids of two phases, a flow dividing section for simulating divided flows of a portion of the fluids, and a flow merging section for simulating confluence of a plurality of fluids, wherein said simulation method simulates occurrence of flows other than the basic flow using the flow dividing section and the flow merging section.

2. The simulation method of an extraction system according to claim 1, wherein said mixing section performs simulation of mass balance calculation and equilibrium concentration calculation separately.

3. The simulation method of an extraction system according to claim 1, wherein said method further comprises the step of providing a settler section for simulating flows of separated fluids in the extractor and a piping section for simulating flows of fluids in sections following the settler section as basic elements composing said extraction system.

4. The simulation method of an extraction system according to claim 1, wherein said method simulates flows other than the basic flow inside the extractor by setting the divided-flow ratio in said flow dividing section.

5. The simulation method of an extraction system according to claim 4, wherein said extractor is a centrifugal extractor which has overflow piping at an inflow section thereof, lets fluids of two phases flow to the outside of a rotor and mixes the two, performing centrifugation inside the rotor, and individually discharges an external fluid and an internal fluid which have been separated by a weir, and simulation of three states of flows other than said basic flow is performed, said three states being an overflow state in which fluids flow out through the overflow piping, an entrainment occurring state in which unseparated fluids of two phases overflow the weir, and a reflux state in which a fluid that has been separated and discharged from the rotor flows back again to the section mixing the fluids of two phases.

6. The simulation method of an extraction system according to claim 4, wherein said extractor is a mixer settler extractor comprising a mixing section and a separation section using gravity, and simulation of three states of flows other than said basic flow is performed, said three states being an overflow state in which fluids flow out through the overflow piping, an entrainment occurring state in which unseparated fluids of two phases overflow the weir, and a reflux state in which a fluid that has been separated and extracted from the rotor flows back again to the section mixing the fluids of two phases.

7. The simulation method of an extraction system according to claim 1, wherein said extraction system is an extraction system for performing multistage extraction with a plurality of extractors connected.

8. A media for storing a simulation program of an extraction system wherein said simulation program:

causes a computer to simulate a processing of an extraction system with extractors that mix fluids of two phases and extract substance including in one fluid into the other fluid;

utilizes object-oriented software for dividing the operation of the extraction system into individual basic elements of appropriate units for individual calculation so that the behavior of each individual basic element can be analyzed separately;

provides, as basic elements composing the extractor, a mixing section for simulating separation and mixing of fluids of two phases and mass transfer between the fluids of two phases, a flow dividing section for simulating a divided flow of a portion of the fluids, and a flow merging section for simulating merging of a plurality of fluids; and simulates occurrence of flows other than the basic flow using the flow dividing section and the flow merging section.

* * * * *